United States Patent
Ding et al.

(10) Patent No.: US 11,023,727 B2
(45) Date of Patent: Jun. 1, 2021

(54) TARGET MONITORING METHOD, CAMERA, CONTROLLER, AND TARGET MONITORING SYSTEM

(71) Applicant: Huawei Technologies Co., Ltd., Shenzhen (CN)

(72) Inventors: Qiang Ding, Shenzhen (CN); Liyao Zhang, Beijing (CN); Hongrui Jiang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 72 days.

(21) Appl. No.: 16/321,744

(22) PCT Filed: Jul. 13, 2017

(86) PCT No.: PCT/CN2017/092864
§ 371 (c)(1),
(2) Date: Jan. 29, 2019

(87) PCT Pub. No.: WO2018/019135
PCT Pub. Date: Feb. 1, 2018

(65) Prior Publication Data
US 2019/0163974 A1    May 30, 2019

(30) Foreign Application Priority Data
Jul. 29, 2016    (CN) .......................... 201610624921.4

(51) Int. Cl.
*G06K 9/00*    (2006.01)
*H04N 7/18*    (2006.01)
(Continued)

(52) U.S. Cl.
CPC ..... *G06K 9/00664* (2013.01); *G06F 16/7335* (2019.01); *G06K 9/00771* (2013.01);
(Continued)

(58) Field of Classification Search
CPC ........... G06T 7/292; G06T 2207/30232; G06T 2207/10016; G06T 2207/20021; G06K 9/00664; G06K 9/00771
See application file for complete search history.

(56) References Cited

U.S. PATENT DOCUMENTS 5,574,498 A * 11/1996 Sakamoto .......... H04N 5/23299
348/169
6,922,493 B2 * 7/2005 Stanek .................. G01S 3/7865
358/450
(Continued)

FOREIGN PATENT DOCUMENTS

CN    101068342 A    11/2007
CN    102137251 A    7/2011
(Continued)

OTHER PUBLICATIONS

Multi-Target Tracking in Multiple Non-Overlapping Cameras using Constrained Dominant Sets, Yonatan Tariku Tesfaye et al., arXiv, Jun. 19, 2017, pp. 1-15, (Year: 2017).*
(Continued)

*Primary Examiner* — Jayesh A Patel
(74) *Attorney, Agent, or Firm* — Conley Rose, P.C.

(57) ABSTRACT

A target monitoring method, a camera, a controller, and a target monitoring system, where the system includes a first camera and a second camera. An overlapping area exists between fields of view of the first camera and the second camera. The method includes obtaining, location information of a to-be-tracked target in a first monitoring picture when the first camera is used as a current primary monitoring camera, determining, based on the location information of the target in the first monitoring picture, whether a location of the target in the first monitoring picture is in the overlapping area, where the overlapping area is an overlapping range between the fields of view of the first camera and
(Continued)

---

101 — When a first camera is used as a current primary monitoring camera, a target monitoring system obtains location information of a to-be-tracked target in a first monitoring picture, where the first monitoring picture is captured by the first camera 102 — The target monitoring system determines, based on the location information of the target in the first monitoring picture, whether a location of the target in the first monitoring picture is in an overlapping area, where the overlapping area is an overlapping range between a field of view of the first camera and a field of view of a second camera 103 — If the location of the target in the first monitoring picture is in the overlapping area, the target monitoring system switches the current primary monitoring camera to the second camera the second camera, and switching, the current primary monitoring camera to the second camera when the location of the target in the first monitoring picture is in the overlapping area.

18 Claims, 7 Drawing Sheets

(51) Int. Cl.
    *G06T 7/292*     (2017.01)
    *H04N 5/232*     (2006.01)
    *G06F 16/732*     (2019.01)
    *H04N 5/225*     (2006.01)

(52) U.S. Cl.
    CPC .......... *G06T 7/292* (2017.01); *H04N 5/2252* (2013.01); *H04N 5/23299* (2018.08); *H04N 7/18* (2013.01); *G06T 2207/10016* (2013.01); *G06T 2207/20021* (2013.01); *G06T 2207/30232* (2013.01)

(56) References Cited

U.S. PATENT DOCUMENTS

| | | | | |
|---|---|---|---|---|
| 7,450,735 | B1* | 11/2008 | Shah | G06T 7/292 348/143 |
| 8,503,727 | B2* | 8/2013 | Naito | G08B 13/19641 382/103 |
| 8,705,799 | B2 | 4/2014 | White et al. | |
| 8,937,660 | B2* | 1/2015 | Nerayoff | G07B 15/00 348/148 |
| 9,398,231 | B2* | 7/2016 | Yuasa | H04N 7/181 |
| 10,055,646 | B2* | 8/2018 | Bataller | G06T 7/75 |
| 10,180,318 | B2* | 1/2019 | Akimoto | H04N 13/239 |
| 2003/0202102 | A1* | 10/2003 | Shiota | G08B 13/19652 348/159 |
| 2004/0105006 | A1* | 6/2004 | Lazo | G06K 9/00771 348/169 |
| 2004/0252194 | A1* | 12/2004 | Lin | H04N 7/181 348/169 |
| 2004/0257444 | A1* | 12/2004 | Maruya | H04N 7/181 348/169 |
| 2006/0066723 | A1* | 3/2006 | Iwase | G08B 13/19608 348/169 |
| 2006/0093185 | A1* | 5/2006 | Kato | G06K 9/00261 382/103 |
| 2006/0107296 | A1* | 5/2006 | Mock | H04N 7/181 725/105 |
| 2007/0039030 | A1* | 2/2007 | Romanowich | H04N 5/247 725/105 |
| 2007/0268369 | A1* | 11/2007 | Amano | H04N 7/18 348/207.99 |
| 2009/0059007 | A1* | 3/2009 | Wagg | G06K 9/00711 348/157 |
| 2009/0096871 | A1 | 4/2009 | Kuwano et al. | |
| 2009/0309760 | A1* | 12/2009 | Chew | G08G 1/14 340/932.2 |
| 2010/0134627 | A1* | 6/2010 | Yen | G06T 7/292 348/159 |
| 2010/0157049 | A1* | 6/2010 | Dvir | G08B 13/19673 348/143 |
| 2011/0069172 | A1* | 3/2011 | Hazzani | G08B 13/19645 348/159 |
| 2011/0069173 | A1* | 3/2011 | Hazzani | H04N 21/21805 348/159 |
| 2012/0045096 | A1 | 2/2012 | Naito et al. | |
| 2013/0002869 | A1* | 1/2013 | Yuasa | G08B 13/19608 348/143 |
| 2014/0022394 | A1* | 1/2014 | Bae | G06K 9/00624 348/169 |
| 2014/0055644 | A1* | 2/2014 | Song | G06K 9/6203 348/240.99 |
| 2014/0240452 | A1* | 8/2014 | Ki | H04N 5/23238 348/38 |
| 2015/0186645 | A1* | 7/2015 | Aziz | H04L 63/1433 726/23 |
| 2016/0080699 | A1* | 3/2016 | Scholl | B60R 1/00 348/148 |
| 2016/0283797 | A1* | 9/2016 | Chung | G06K 9/00771 |
| 2016/0309095 | A1* | 10/2016 | Laroia | H04N 5/23241 |
| 2016/0344928 | A1* | 11/2016 | Qu | H04N 5/23296 |
| 2017/0006234 | A1* | 1/2017 | Higuchi | G06T 3/4038 |
| 2017/0154424 | A1* | 6/2017 | Uchiyama | G01S 3/00 |
| 2018/0077355 | A1* | 3/2018 | Kouno | G08B 13/19608 |

FOREIGN PATENT DOCUMENTS

| | | | | |
|---|---|---|---|---|
| CN | 102387345 | A | 3/2012 | |
| CN | 102414719 | A | 4/2012 | |
| CN | 202190348 | U | 4/2012 | |
| CN | 102821246 | A | 12/2012 | |
| CN | 103400371 | A | 11/2013 | |
| CN | 103607569 | A | 2/2014 | |
| CN | 104123732 | A | 10/2014 | |
| CN | 104660998 | A | 5/2015 | |
| CN | 105763847 | A | 7/2016 | |
| JP | 2011193187 | A | 9/2011 | |
| KR | 20120110422 | A * | 10/2012 | ....... G08B 13/19645 |
| WO | WO-2007104367 | A1 * | 9/2007 | ............. H04N 7/181 |
| WO | WO-2012035927 | A1 * | 3/2012 | ........... H04N 13/371 |
| WO | 2016049370 | A1 | 7/2016 | |

OTHER PUBLICATIONS

Autonomous Multicamera Tracking on Embedded Smart Cameras, Markus Quaritsch et al., EURASIP, 1155/2007/92827, 2007, pp. 1-10 (Year: 2007).*
Automatic Tracking of Human Motion in Indoor Scenes Across Multiple Synchronized Video Streams, Q. Cai et al., IEEE, Aug. 6, 2002, pp. 356-362 (Year: 2002).*
Inference topology of distributed camera networks with multiple cameras, Yunyoung Nam et al., Springer, 10.1007/s11042-012-0997-0, 2013, pp. 289-309 (Year: 2013).*
Machine Translation and Abstract of Chinese Publication No. CN101068342, Nov. 7, 2007, 13 pages.
Machine Translation and Abstract of Chinese Publication No. CN102387345, Mar. 21, 2012, 31 pages.
Machine Translation and Abstract of Chinese Publication No. CN103400371, Nov. 20, 2013, 11 pages.
Machine Translation and Abstract of Chinese Publication No. CN104123732, Oct. 29, 2014, 15 pages.
Machine Translation and Abstract of Chinese Publication No. CN202190348, Apr. 11, 2012, 7 pages.
Machine Translation and Abstract of Japanese Publication No. JP2011193187, Sep. 29, 2011, 23 pages.
Zhihua, L., et al. "Continuous target tracking based on multiple cameras," Journal of Electronic Measurement and Instrument, vol. 23, No. 2, Feb. 2009, 6 pages. With English abstract.
Foreign Communication From a Counterpart Application, PCT Application No. PCT/CN2017/092864, English Translation of International Search Report dated Sep. 26, 2017, 2 pages.
Foreign Communication From a Counterpart Application, PCT Application No. PCT/CN2017/092864, English Translation of Written Opinion dated Sep. 26, 2017, 6 pages.
Machine Translation and Abstract of Chinese Publication No. CN104660998, May 27, 2015, 12 pages.
Foreign Communication From a Counterpart Application, European Application No. 17833438.9, Extended European Search Report dated Apr. 17, 2019, 7 pages.
Machine Translation and Abstract of Chinese Publication No. CN102137251, Jul. 27, 2011, 9 pages.
Machine Translation and Abstract of Chinese Publication No. CN102821246, Dec. 12, 2012, 7 pages.
Machine Translation and Abstract of Chinese Publication No. CN103607569, Feb. 26, 2014, 14 pages.

(56) References Cited

OTHER PUBLICATIONS

Machine Translation and Abstract of Chinese Publication No. CN105763847, Jul. 13, 2016, 27 pages.
Foreign Communication From a Counterpart Application, Chinese Application No. 201610624921.4, Chinese Office Action dated Apr. 28, 2019, 7 pages.

* cited by examiner

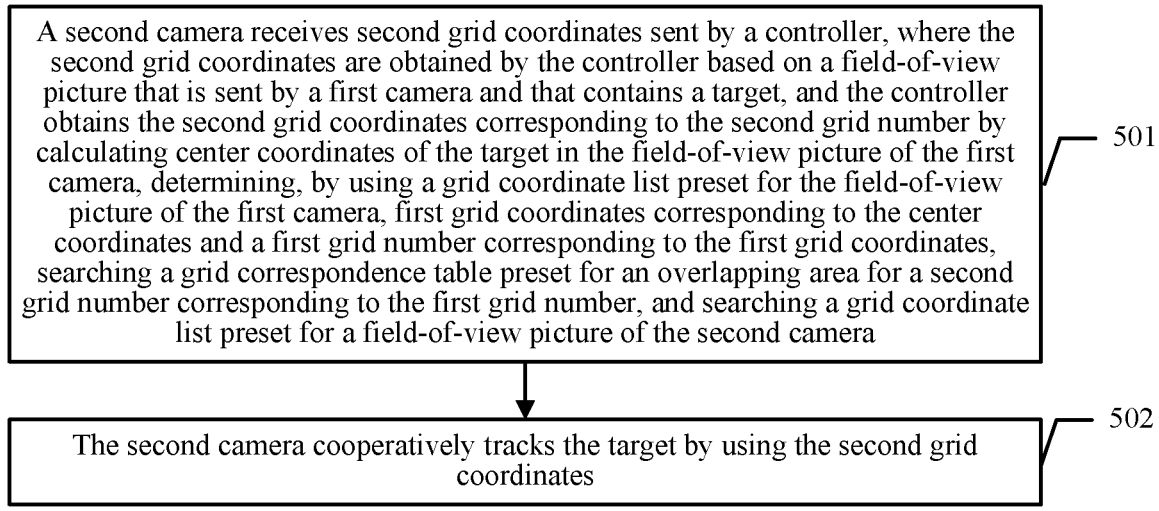
FIG. 5
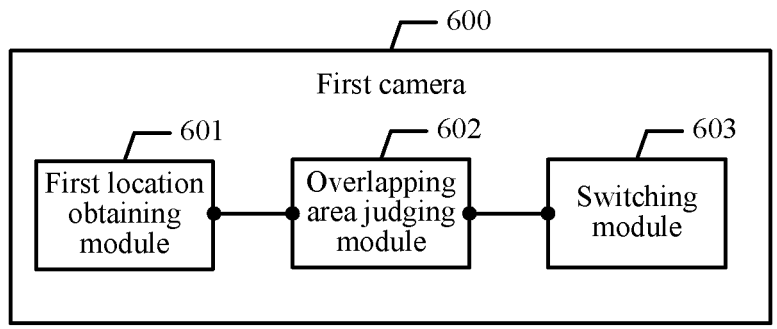
FIG. 6-a
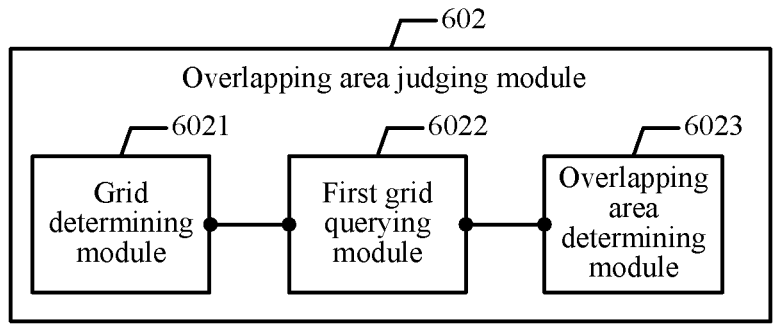
FIG. 6-b

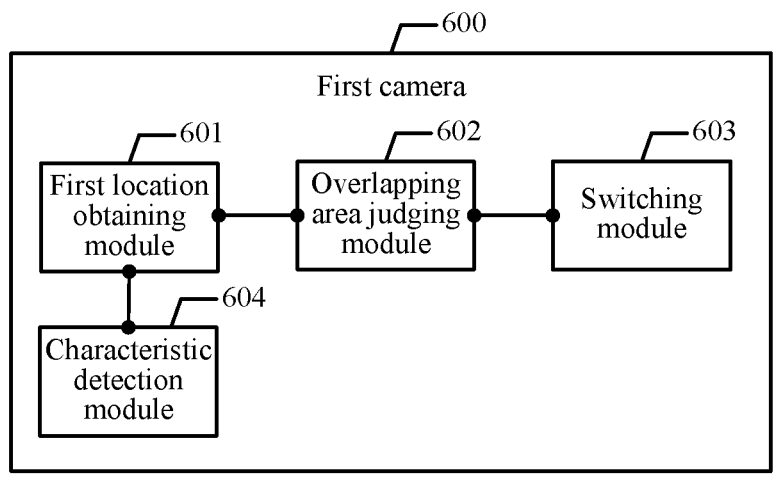
FIG. 6-c
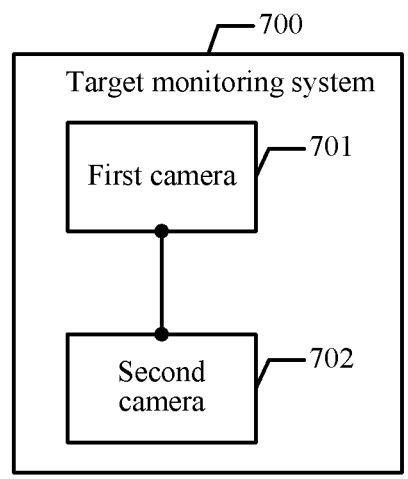
FIG. 7-a

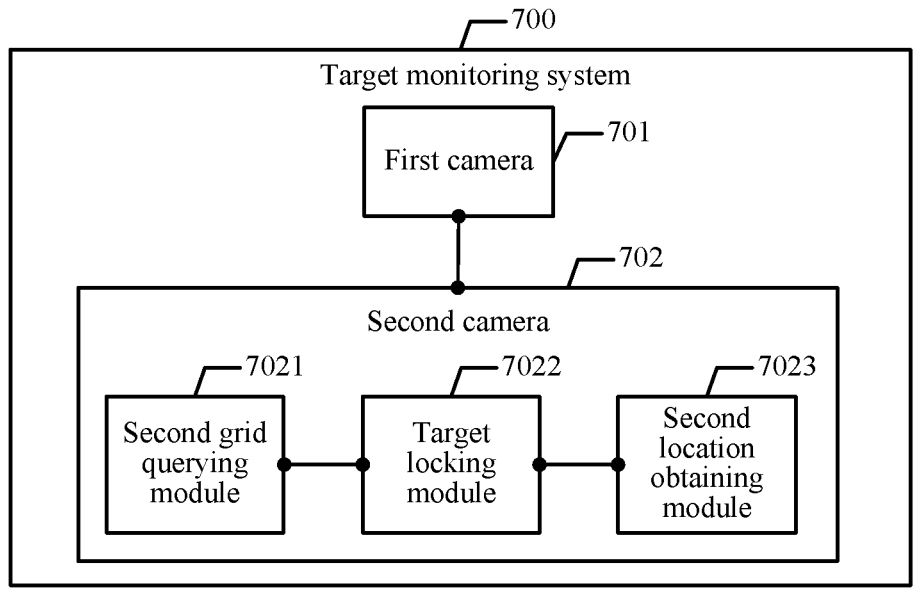
FIG. 7-b
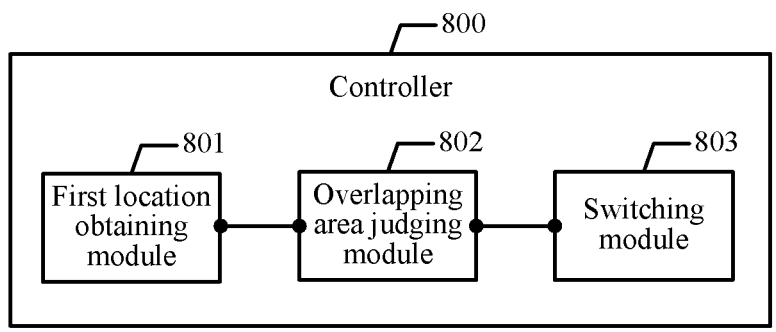
FIG. 8-a
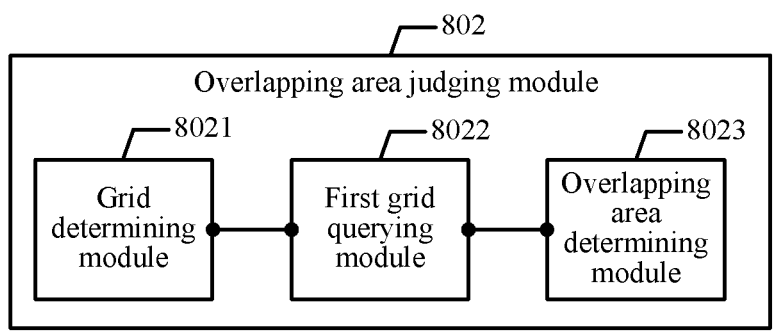
FIG. 8-b

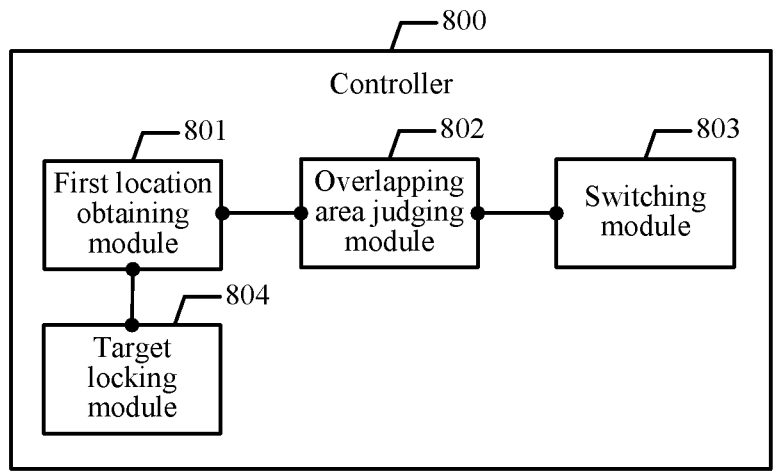
FIG. 8-c
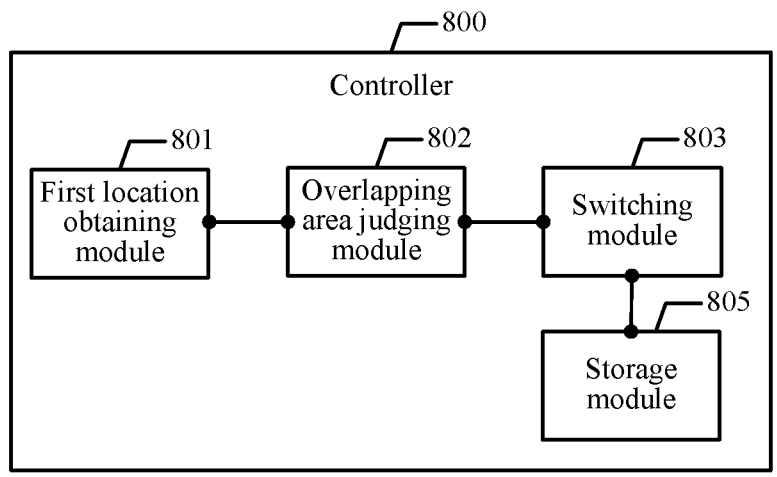
FIG. 8-d
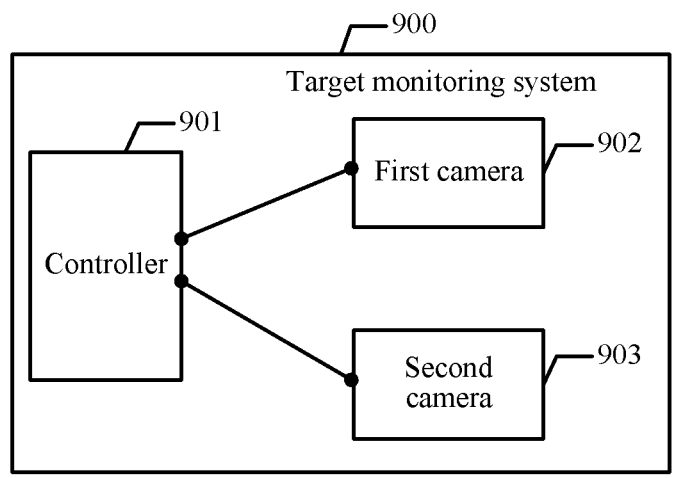
FIG. 9-a

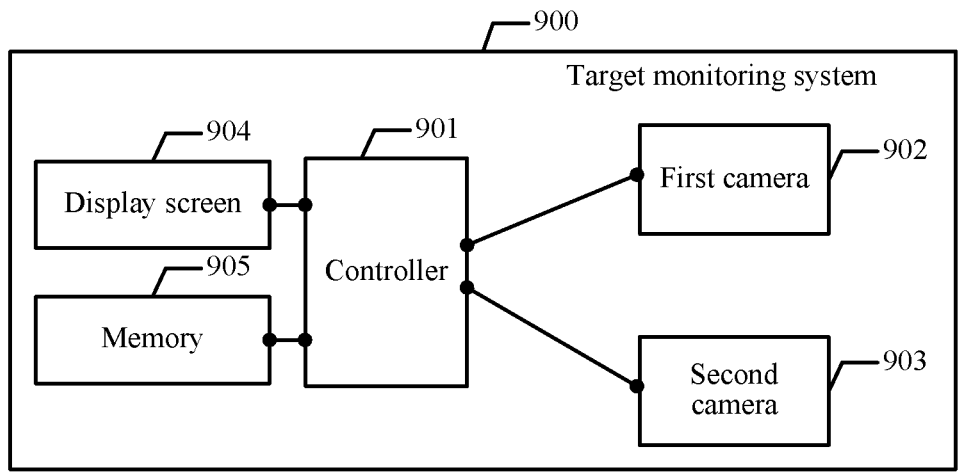
FIG. 9-b
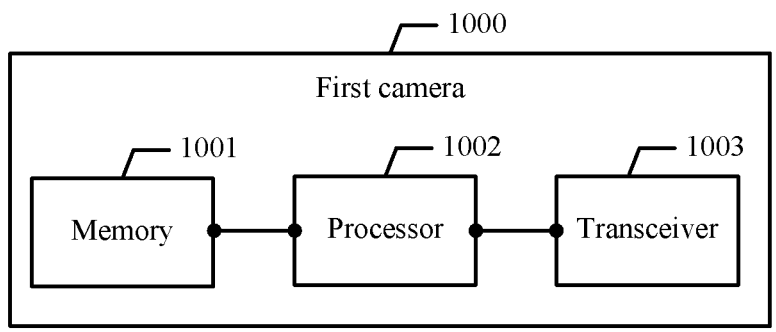
FIG. 10
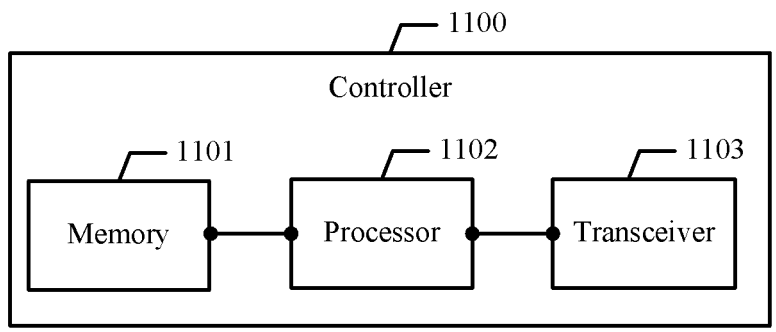
FIG. 11

TARGET MONITORING METHOD, CAMERA, CONTROLLER, AND TARGET MONITORING SYSTEM

CROSS-REFERENCE TO RELATED APPLICATIONS

This application is a U.S. National Stage of International Patent Application No. PCT/CN2017/092864 filed on Jul. 13, 2017, which claims priority to Chinese Patent Application No. 201610624921.4 filed on Jul. 29, 2016. Both of the aforementioned applications are hereby incorporated by reference in their entireties.

TECHNICAL FIELD

Embodiments of the present invention relate to the field of monitoring technologies, and in particular, to a target monitoring method, a camera, a controller, and a target monitoring system.

BACKGROUND

In a current wide area video surveillance system, a scenario may be observed and a moving target may be tracked from a plurality of angles and on a large scale by arranging a plurality of cameras. In such a monitoring system, the entire monitoring scenario is usually divided into several independent areas. Each camera independently monitors one area, locates a target when the target appears, simultaneously performs tracking and detection, and then transmits a monitoring record to a server. The server analyzes the monitoring record, and then schedules all the cameras in a unified manner to cooperatively monitor the target.

In the foregoing monitoring system, when continuously tracking the moving target, each camera independently monitors its area. All the cameras are scheduled in a unified manner by the server for monitoring. Each camera needs to determine a location of the target by performing detection in its monitoring area by using characteristic information of the target. Consequently, a detection time of each camera is relatively long, and efficiency of tracking the target is relatively low.

SUMMARY

In view of this, embodiments of the present invention provide a target monitoring method, a camera, a controller, and a target monitoring system, to implement location sharing of a target and improve efficiency of tracking the target.

According to a first aspect, an embodiment of the present invention provides a target monitoring method. The target monitoring method is applied to a target monitoring system, the target monitoring system includes a first camera and a second camera, and the target monitoring method includes:

when the first camera is used as a current primary monitoring camera, obtaining, by the target monitoring system, location information of a to-be-tracked target in a first monitoring picture, where the first monitoring picture is captured by the first camera;

determining, by the target monitoring system based on the location information of the target in the first monitoring picture, whether a location of the target in the first monitoring picture is in an overlapping area, where the overlapping area is an overlapping range between a field of view of the first camera and a field of view of the second camera; and if the location of the target in the first monitoring picture is in the overlapping area, switching, by the target monitoring system, the current primary monitoring camera to the second camera.

In this embodiment of the present invention, the overlapping area exists between the fields of view of the first camera and the second camera. For the overlapping area, when the to-be-tracked target moves from the first monitoring picture to the overlapping area, the primary camera is switched from the first camera to the second camera. Location sharing of the target may be implemented between the first camera and the second camera. Once the target enters the overlapping area between the fields of view of the two cameras, the second camera may determine a location of the target in a field-of-view picture of the second camera by using the neighboring first camera, and may rapidly track the target based on the location. Each camera does not need to perform detection by itself to determine the location of the target. Therefore, tracking efficiency can be improved.

With reference to the first aspect, in a first possible implementation of the first aspect, the determining, by the target monitoring system based on the location information of the target in the first monitoring picture, whether a location of the target in the first monitoring picture is in an overlapping area includes:

determining, by the target monitoring system, a grid number of the target in the first monitoring picture based on the location information of the target in the first monitoring picture, where a plurality of grids are preset in the first monitoring picture, the plurality of grids have different grid numbers, and the plurality of grids correspond to different location areas in the first monitoring picture;

querying, by the target monitoring system according to the grid number of the target in the first monitoring picture, a grid correspondence table of the overlapping area, where the grid correspondence table includes a correspondence between a grid in which a physical location point is located in the first monitoring picture and a grid in which the same physical location point is located in a second monitoring picture, and the second monitoring picture is captured by the second camera; and if the grid number of the target in the first monitoring picture is obtained through query in the grid correspondence table, determining, by the target monitoring system, that the location of the target in the first monitoring picture is in the overlapping area.

In this embodiment of the present invention, the grid correspondence table may be configured for the overlapping area between the fields of view of the first camera and the second camera by preconfiguring grids in the first monitoring picture and the second monitoring picture. It may be determined, by querying the grid correspondence table, that the location of the target in the first monitoring picture is in the overlapping area.

With reference to the first possible implementation of the first aspect, in a second possible implementation of the first aspect, after the switching, by the target monitoring system, the current primary monitoring camera to the second camera, the method further includes:

when the second camera is used as the primary monitoring camera after switching, querying, by the target monitoring system, the grid correspondence table according to the obtained grid number of the target in the first monitoring picture;

if a grid number of the target in the second monitoring picture is obtained through query in the grid correspondence table, determining, by the target monitoring system, that the target is found in the second monitoring picture; and obtaining, by the target monitoring system, location information of the target in the second monitoring picture according to the grid number of the target in the second monitoring picture.

In this embodiment of the present invention, the target monitoring system queries the grid correspondence table according to the obtained grid number of the target in the first monitoring picture. If the grid number of the target in the second monitoring picture is obtained through query in the grid correspondence table, the target monitoring system determines that the target is found in the second monitoring picture. Therefore, the target monitoring system obtains the location information of the target in the second monitoring picture according to the grid number of the target in the second monitoring picture.

With reference to the first aspect, the first of the first aspect, or the second possible implementation of the first aspect, in a third possible implementation of the first aspect, before the obtaining, by the target monitoring system, location information of a to-be-tracked target in a first monitoring picture, the method further includes:

obtaining, by the target monitoring system, characteristic information of the target, and detecting, based on the characteristic information, whether the target appears in the first monitoring picture; and if the target appears in the first monitoring picture, triggering performing of the following step of obtaining, by the target monitoring system, location information of a to-be-tracked target in a first monitoring picture.

In this embodiment of the present invention, characteristic detection is performed on the to-be-tracked target, so that a camera in which the target appears in the target monitoring system can be determined in real time. The camera in which the target appears can be used as the primary camera.

With reference to the first aspect, the first possible implementation of the first aspect, the second possible implementation of the first aspect, or the third possible implementation of the first aspect, in a fourth possible implementation of the first aspect, the target monitoring system further includes a controller, and the obtaining, by the target monitoring system, location information of a to-be-tracked target in a first monitoring picture includes:

obtaining, by the controller, the characteristic information of the target, and detecting the characteristic information of the target in the first monitoring picture; and if the characteristic information is detected in the first monitoring picture, calculating, by the controller, the location information of the target in the first monitoring picture, and sending the location information of the target in the first monitoring picture to the first camera.

In this embodiment of the present invention, the controller performs real-time detection, so that the first camera can obtain the location information of the target in the first monitoring picture from the controller. Therefore, the first camera is used as the primary camera and can continuously track the target.

With reference to the first aspect, the first possible implementation of the first aspect, the second possible implementation of the first aspect, the third possible implementation of the first aspect, or the fourth possible implementation of the first aspect, in a fifth possible implementation of the first aspect, the target monitoring system further includes the controller and a monitoring screen, and the switching, by the target monitoring system, the current primary monitoring camera to the second camera specifically includes:

switching, by the controller, the second monitoring picture to the monitoring screen; or highlighting, by the controller, the second monitoring picture on the monitoring screen; or splicing, by the controller, the second monitoring picture and the first monitoring picture, and displaying a spliced picture on the monitoring screen.

In this embodiment of the present invention, a target moving process in which the target moves from the first monitoring picture to the second monitoring picture can be visually displayed by using the monitoring screen, thereby tracking a place from which the target comes and a place to which the target is headed.

With reference to the first aspect, the first possible implementation of the first aspect, the second possible implementation of the first aspect, the third possible implementation of the first aspect, the fourth possible implementation of the first aspect, or the fifth possible implementation of the first aspect, in a sixth possible implementation of the first aspect, the target monitoring system further includes the controller and a memory, and after the switching, by the target monitoring system, the current primary monitoring camera to the second camera, the method further includes:

storing, by the controller in the memory, the second monitoring picture obtained by the second camera by photographing the target.

In this embodiment of the present invention, to record tracking on the target, the second monitoring picture captured by the second camera when the second camera is used as the primary camera may be stored in the memory, so that a video image in which the target appears in the second monitoring picture is directly extracted by using the memory, thereby rapidly and intuitively obtaining the video or the image of the target without manually searching all monitoring pictures in which the target is not paragraphed.

According to a second aspect, an embodiment of the present invention further provides a camera. The camera is specifically a first camera in a target monitoring system, the target monitoring system includes the first camera and a second camera, and the first camera includes:

a first location obtaining module, configured to: when the first camera is used as a current primary monitoring camera, obtain location information of a to-be-tracked target in a first monitoring picture, where the first monitoring picture is captured by the first camera;

an overlapping area judging module, configured to determine, based on the location information of the target in the first monitoring picture, whether a location of the target in the first monitoring picture is in an overlapping area, where the overlapping area is an overlapping range between a field of view of the first camera and a field of view of the second camera; and a switching module, configured to: if the location of the target in the first monitoring picture is in the overlapping area, switch the current primary monitoring camera to the second camera.

In this embodiment of the present invention, the overlapping area exists between the fields of view of the first camera and the second camera. For the overlapping area, when the to-be-tracked target moves from the first monitoring picture to the overlapping area, the primary camera is switched from the first camera to the second camera. Location sharing of the target may be implemented between the first camera and the second camera. Once the target enters the overlapping area between the fields of view of the two cameras, the second camera may determine a location of the target in a field-of-view picture of the second camera by using the neighboring first camera, and may rapidly track the target based on the location. Each camera does not need to perform detection by itself to determine the location of the target. Therefore, tracking efficiency can be improved.

With reference to the second aspect, in a first possible implementation of the second aspect, the overlapping area judging module includes:

a grid determining module, configured to determine a grid number of the target in the first monitoring picture based on the location information of the target in the first monitoring picture, where a plurality of grids are preset in the first monitoring picture, the plurality of grids have different grid numbers, and the plurality of grids correspond to different location areas in the first monitoring picture;

a first grid querying module, configured to query, according to the grid number of the target in the first monitoring picture, a grid correspondence table of the overlapping area, where the grid correspondence table includes a correspondence between a grid in which a physical location point is located in the first monitoring picture and a grid in which the same physical location point is located in a second monitoring picture, and the second monitoring picture is captured by the second camera; and an overlapping area determining module, configured to: if the grid number of the target in the first monitoring picture is obtained through query in the grid correspondence table, determine that the location of the target in the first monitoring picture is in the overlapping area.

In this embodiment of the present invention, the grid correspondence table may be configured for the overlapping area between the fields of view of the first camera and the second camera by preconfiguring grids in the first monitoring picture and the second monitoring picture. It may be determined, by querying the grid correspondence table, that the location of the target in the first monitoring picture is in the overlapping area.

With reference to the second aspect or the first possible implementation of the second aspect, in a second possible implementation of the second aspect, the first camera further includes a characteristic detection module; and the characteristic detection module is configured to: before the first location obtaining module obtains the location information of the to-be-tracked target in the first monitoring picture, obtain characteristic information of the target, and detect, based on the characteristic information, whether the target appears in the first monitoring picture; and if the target appears in the first monitoring picture, trigger execution of the location obtaining module.

In this embodiment of the present invention, characteristic detection is performed on the to-be-tracked target, so that a camera in which the target appears in the target monitoring system can be determined in real time. The camera in which the target appears can be used as the primary camera.

According to a third aspect, an embodiment of the present invention further provides a target monitoring system. The target monitoring system includes the first camera according to any one of claims 8 to 10 and a second camera.

In this embodiment of the present invention, an overlapping area exists between fields of view of the first camera and the second camera. For the overlapping area, when a to-be-tracked target moves from a first monitoring picture to the overlapping area, a primary camera is switched from the first camera to the second camera. Location sharing of the target may be implemented between the first camera and the second camera. Once the target enters the overlapping area between the fields of view of the two cameras, the second camera may determine a location of the target in a field-of-view picture of the second camera by using the neighboring first camera, and may rapidly track the target based on the location. Each camera does not need to perform detection by itself to determine the location of the target. Therefore, tracking efficiency can be improved.

With reference to the third aspect, in a first possible implementation of the third aspect, the second camera includes:

a second grid querying module, configured to: after the first camera switches a current primary monitoring camera to the second camera, when the second camera is used as the primary monitoring camera after switching, query the grid correspondence table according to an obtained grid number of the target in the first monitoring picture;

a target locking module, configured to: if a grid number of the target in the second monitoring picture is obtained through query in the grid correspondence table, determine that the target is found in the second monitoring picture; and a second location obtaining module, configured to obtain location information of the target in the second monitoring picture according to the grid number of the target in the second monitoring picture.

In this embodiment of the present invention, the target monitoring system queries the grid correspondence table according to the obtained grid number of the target in the first monitoring picture. If the grid number of the target in the second monitoring picture is obtained through query in the grid correspondence table, the target monitoring system determines that the target is found in the second monitoring picture. Therefore, the target monitoring system obtains the location information of the target in the second monitoring picture according to the grid number of the target in the second monitoring picture.

According to a fourth aspect, an embodiment of the present invention further provides a controller. The controller is deployed in a target monitoring system, the target monitoring system includes the controller, a first camera, and a second camera, and the controller includes:

a location obtaining module, configured to: when the first camera is used as a current primary monitoring camera, obtain location information of a to-be-tracked target in a first monitoring picture, where the first monitoring picture is captured by the first camera;

an overlapping area judging module, configured to determine, based on the location information of the target in the first monitoring picture, whether a location of the target in the first monitoring picture is in an overlapping area, where the overlapping area is an overlapping range between a field of view of the first camera and a field of view of the second camera; and a switching module, configured to: if the location of the target in the first monitoring picture is in the overlapping area, switch the current primary monitoring camera to the second camera.

In this embodiment of the present invention, the overlapping area exists between the fields of view of the first camera and the second camera. For the overlapping area, when the to-be-tracked target moves from the first monitoring picture to the overlapping area, the primary camera is switched from the first camera to the second camera. Location sharing of the target may be implemented between the first camera and the second camera. Once the target enters the overlapping area between the fields of view of the two cameras, the second camera may determine a location of the target in a field-of-view picture of the second camera by using the neighboring first camera, and may rapidly track the target based on the location. Each camera does not need to perform detection by itself to determine the location of the target. Therefore, tracking efficiency can be improved.

With reference to the fourth aspect, in a first possible implementation of the fourth aspect, the overlapping area judging module includes:

a grid determining module, configured to determine a grid number of the target in the first monitoring picture based on the location information of the target in the first monitoring picture, where a plurality of grids are preset in the first monitoring picture, the plurality of grids have different grid numbers, and the plurality of grids correspond to different location areas in the first monitoring picture;

a grid querying module, configured to query, according to the grid number of the target in the first monitoring picture, a grid correspondence table of the overlapping area, where the grid correspondence table includes a correspondence between a grid in which a physical location point is located in the first monitoring picture and a grid in which the same physical location point is located in a second monitoring picture, and the second monitoring picture is captured by the second camera; and an overlapping area determining module, configured to: if the grid number of the target in the first monitoring picture is obtained through query in the grid correspondence table, determine that the location of the target in the first monitoring picture is in the overlapping area.

In this embodiment of the present invention, the grid correspondence table may be configured for the overlapping area between the fields of view of the first camera and the second camera by preconfiguring grids in the first monitoring picture and the second monitoring picture. It may be determined, by querying the grid correspondence table, that the location of the target in the first monitoring picture is in the overlapping area.

With reference to the fourth aspect or the first possible implementation of the fourth aspect, in a second possible implementation of the fourth aspect, the controller further includes:

a target locking module, configured to: after the first camera switches the current primary monitoring camera to the second camera, when the second camera is used as the primary monitoring camera after switching, query the grid correspondence table according to the obtained grid number of the target in the first monitoring picture; and if a grid number of the target in the second monitoring picture is obtained through query in the grid correspondence table, determine that the target is found in the second monitoring picture; and the location obtaining module is further configured to obtain location information of the target in the second monitoring picture according to the grid number of the target in the second monitoring picture.

In this embodiment of the present invention, the target monitoring system queries the grid correspondence table according to the obtained grid number of the target in the first monitoring picture. If the grid number of the target in the second monitoring picture is obtained through query in the grid correspondence table, the target monitoring system determines that the target is found in the second monitoring picture. Therefore, the target monitoring system obtains the location information of the target in the second monitoring picture according to the grid number of the target in the second monitoring picture.

With reference to the fourth aspect, the first possible implementation of the fourth aspect, or the second possible implementation of the fourth aspect, in a third possible implementation of the fourth aspect, the location obtaining module is specifically configured to: before the location obtaining module obtains the location information of the to-be-tracked target in the first monitoring picture, detect characteristic information of the target in the first monitoring picture; and if the characteristic information is detected in the first monitoring picture, calculate the location information of the target in the first monitoring picture, and send the location information of the target in the first monitoring picture to the first camera.

In this embodiment of the present invention, the controller performs real-time detection, so that the first camera can obtain the location information of the target in the first monitoring picture from the controller. Therefore, the first camera is used as the primary camera and can continuously track the target.

With reference to the fourth aspect, the first possible implementation of the fourth aspect, the second possible implementation of the fourth aspect, or the third possible implementation of the fourth aspect, in a fourth possible implementation of the fourth aspect, the target monitoring system further includes a monitoring screen, and the switching module is specifically configured to switch the second monitoring picture to the monitoring screen, or highlight the second monitoring picture on the monitoring screen, or splice the second monitoring picture and the first monitoring picture, and display a spliced picture on the monitoring screen.

In this embodiment of the present invention, a target moving process in which the target moves from the first monitoring picture to the second monitoring picture can be visually displayed by using the monitoring screen, thereby tracking a place from which the target comes and a place to which the target is headed.

With reference to the fourth aspect, the first possible implementation of the fourth aspect, the second possible implementation of the fourth aspect, the third possible implementation of the fourth aspect, or the fourth possible implementation of the fourth aspect, in a fifth possible implementation of the fourth aspect, the target monitoring system further includes a memory, and the controller further includes a storage module configured to: after the switching module switches the current primary monitoring camera to the second camera, store, in the memory, the second monitoring picture obtained by the second camera by photographing the target.

In this embodiment of the present invention, to record tracking on the target, the second monitoring picture captured by the second camera when the second camera is used as the primary camera may be stored in the memory, so that a video image in which the target appears in the second monitoring picture is directly extracted by using the memory, thereby rapidly and intuitively obtaining the video or the image of the target without manually searching all monitoring pictures in which the target is not paragraphed.

According to a fifth aspect, an embodiment of the present invention further provides a target monitoring system. The target monitoring system includes the controller according to any possible implementation of the fourth aspect, a first camera, and a second camera.

In this embodiment of the present invention, an overlapping area exists between fields of view of the first camera and the second camera. For the overlapping area, when a to-be-tracked target moves from a first monitoring picture to the overlapping area, a primary camera is switched from the first camera to the second camera. Location sharing of the target may be implemented between the first camera and the second camera. Once the target enters the overlapping area between the fields of view of the two cameras, the second camera may determine a location of the target in a field-of-view picture of the second camera by using the neighboring first camera, and may rapidly track the target based on the location. Each camera does not need to perform detection by itself to determine the location of the target. Therefore, tracking efficiency can be improved.

With reference to the fifth aspect, in a first possible implementation of the fifth aspect, the target monitoring system further includes a monitoring screen and/or a memory.

In this embodiment of the present invention, to record tracking on the target, a second monitoring picture captured by the second camera when the second camera is used as the primary camera may be stored in the memory, so that a video image in which the target appears in the second monitoring picture is directly extracted by using the memory, thereby rapidly and intuitively obtaining the video or the image of the target without manually searching all monitoring pictures in which the target is not paragraphed.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and persons of ordinary skill in the art may still derive other drawings from these accompanying drawings without creative efforts.

FIG. 5 is another schematic flowchart of a target monitoring method according to an embodiment of the present invention;

FIG. 6-a is a schematic structural diagram of a camera according to an embodiment of the present invention;

FIG. 6-b is another schematic structural diagram of a camera according to an embodiment of the present invention;

FIG. 6-c is another schematic structural diagram of a camera according to an embodiment of the present invention;

FIG. 7-a is a schematic diagram of a target monitoring system according to an embodiment of the present invention;

FIG. 7-b is a schematic diagram of a target monitoring system according to an embodiment of the present invention;

FIG. 8-a is a schematic structural diagram of a controller according to an embodiment of the present invention;

FIG. 8-b is another schematic structural diagram of a controller according to an embodiment of the present invention;

FIG. 8-c is another schematic structural diagram of a controller according to an embodiment of the present invention;

FIG. 8-d is another schematic structural diagram of a controller according to an embodiment of the present invention;

FIG. 9-a is a schematic diagram of a target monitoring system according to an embodiment of the present invention;

FIG. 9-b is another schematic diagram of a target monitoring system according to an embodiment of the present invention;

FIG. 10 is another schematic structural diagram of a camera according to an embodiment of the present invention; and FIG. 11 is another schematic structural diagram of a controller according to an embodiment of the present invention.

DESCRIPTION OF EMBODIMENTS

The following describes the technical solutions in the embodiments of the present invention with reference to the accompanying drawings in the embodiments of the present invention. Apparently, the described embodiments are merely some but not all embodiments of the present invention. All other embodiments obtained by persons of ordinary skill in the art based on the embodiments of the present invention without creative efforts shall fall within the protection scope of the present invention.

It can be learned from the descriptions in the background that, in the prior art, a plurality of cameras cannot cooperatively track a target. Usually, each camera performs target detection and tracking based on an independent divided monitoring area. That is, monitoring areas of the cameras do not overlap, and the cameras cannot share location coordinates. Consequently, efficiency of cooperative tracking is relatively low.

In the embodiments of the present invention, there are a plurality of cameras cooperatively tracking a target. The plurality of cameras may include a first camera and a second camera that are neighboring to each other. An overlapping area exists between a field of view of the first camera and a field of view of the second camera. In the following embodiment, an example in which the cameras cooperatively tracking a target include the first camera and the second camera are used for description.

Figure 1:
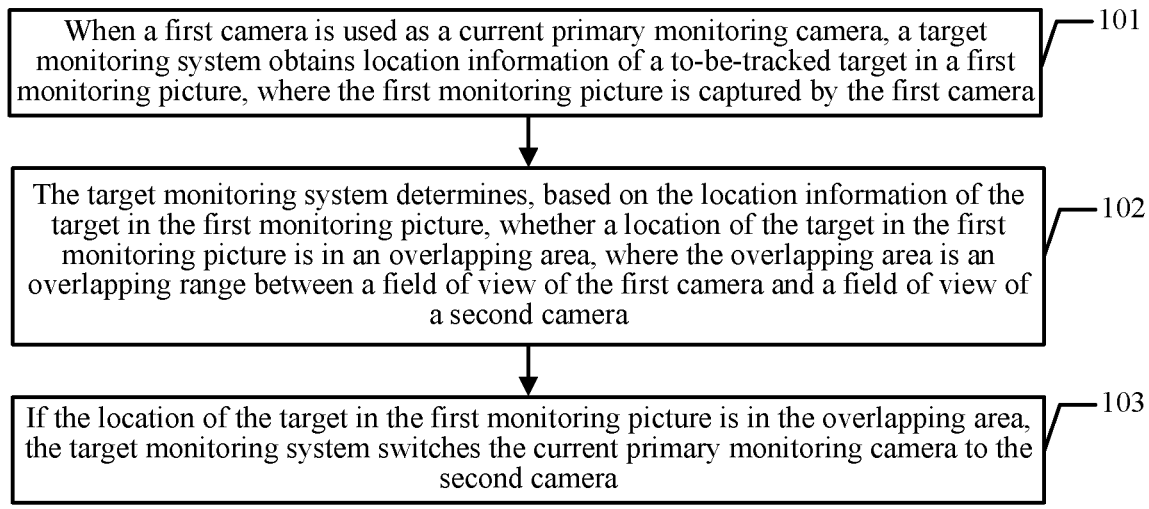
FIG. 1 is a schematic flowchart of a target monitoring method according to an embodiment of the present invention.

First, an implementation process in which a primary camera is switched based on motion of a target in an embodiment of the present invention is described. A target monitoring method provided in this embodiment of the present invention may be applied to a target monitoring system. The target monitoring system includes a first camera and a second camera. Referring to FIG. 1, the method in this embodiment includes the following steps.

101. When the first camera is used as a current primary monitoring camera, the target monitoring system obtains location information of a to-be-tracked target in a first monitoring picture, where the first monitoring picture is captured by the first camera.

In this embodiment of the present invention, the target monitoring system includes at least the first camera and the second camera. The two cameras are deployed neighboring to each other. Without any limitation, in addition to the first camera and the second camera, the target monitoring system in this embodiment of the present invention may further include more cameras. For a target monitoring method for other cameras, refer to a switching process of the primary camera between the first camera and the second camera. The first camera captures the first monitoring picture. When the first camera is used as the current primary monitoring camera, the target monitoring system obtains the location information of the to-be-tracked target in the first monitoring picture. For example, the location information of the to-be-tracked target in the first monitoring picture may be obtained by using the first camera, or the location information of the to-be-tracked target in the first monitoring picture may be obtained by using a controller in the target monitoring system. This is not specifically limited herein.

In some embodiments of the present invention, before step 101 in which the target monitoring system obtains the location information of the to-be-tracked target in the first monitoring picture, the method provided in this embodiment of the present invention further includes the following steps:

A1. The target monitoring system obtains characteristic information of the target, and detects, based on the characteristic information, whether the target appears in the first monitoring picture.

A2. If the target appears in the first monitoring picture, trigger performing of step 101 of obtaining, by the target monitoring system, location information of a to-be-tracked target in a first monitoring picture.

The characteristic information of the target may be preconfigured in the target monitoring system. The target monitoring system detects, based on the characteristic information of the target, whether the target appears in the first monitoring picture, and if the target appears in the first monitoring picture, configures the first camera corresponding to the first monitoring picture as the current primary camera, and then performs step 101. Characteristic detection is performed on the to-be-tracked target, so that a camera in which the target appears in the target monitoring system can be determined in real time. The camera in which the target appears can be used as the primary camera.

In some embodiments of the present invention, the target monitoring system further includes a controller, and step 101 in which the target monitoring system obtains the location information of the to-be-tracked target in the first monitoring picture includes the following steps:

B1. The controller obtains the characteristic information of the target, and detects the characteristic information of the target in the first monitoring picture.

B2. If the characteristic information is detected in the first monitoring picture, the controller calculates the location information of the target in the first monitoring picture, and sends the location information of the target in the first monitoring picture to the first camera.

In this embodiment of the present invention, a controller may be configured in the target monitoring system. The controller may be configured to detect the characteristic information of the target, to determine whether the characteristic information of the target appears in the first monitoring picture. If the characteristic information is detected in the first monitoring picture, the controller calculates the location information of the target in the first monitoring picture. The controller may send the location information of the target in the first monitoring picture to the first camera. Therefore, the first camera can obtain the location information of the target in the first monitoring picture from the controller. In this embodiment of the present invention, the controller performs real-time detection, so that the first camera can obtain the location information of the target in the first monitoring picture from the controller. Therefore, the first camera is used as the primary camera and can continuously track the target.

102. The target monitoring system determines, based on the location information of the target in the first monitoring picture, whether a location of the target in the first monitoring picture is in an overlapping area, where the overlapping area is an overlapping range between a field of view of the first camera and a field of view of the second camera.

In this embodiment of the present invention, when the first camera and the second camera are installed, the fields of view of the two cameras may be configured, to form the overlapping area between the first camera and the second camera. The overlapping area is the overlapping range between the field of view of the first camera and the field of view of the second camera. Without any limitation, the second camera may be the only camera that has an overlapping area with the first camera. The second camera herein is merely an implementable manner. The to-be-tracked target moves in real time. The target is movable in the first monitoring picture. The target may move to the overlapping area between the first camera and the second camera, or the target may move to an overlapping area between the first camera and a third camera. This is not limited herein. When the target moves in the first monitoring picture, the target monitoring system may determine, based on the location information of the target in the first monitoring picture, whether the location of the target in the first monitoring picture is in the overlapping area, and if the location of the target in the first monitoring picture is in the overlapping area, triggers performing of step 103.

In some embodiments of the present invention, step 102 in which the target monitoring system determines, based on the location information of the target in the first monitoring picture, whether the location of the target in the first monitoring picture is in an overlapping area includes the following steps:

C1. The target monitoring system determines a grid number of the target in the first monitoring picture based on the location information of the target in the first monitoring picture, where a plurality of grids are preset in the first monitoring picture, the plurality of grids have different grid numbers, and the plurality of grids correspond to different location areas in the first monitoring picture.

C2. The target monitoring system queries, according to the grid number of the target in the first monitoring picture, a grid correspondence table of the overlapping area, where the grid correspondence table includes a correspondence between a grid in which a physical location point is located in the first monitoring picture and a grid in which the same physical location point is located in a second monitoring picture, and the second monitoring picture is captured by the second camera.

C3. If the grid number of the target in the first monitoring picture is obtained through query in the grid correspondence table, the target monitoring system determines that the location of the target in the first monitoring picture is in the overlapping area.

In some embodiments of the present invention, the plurality of grids may be preset in the first monitoring picture, the plurality of grids have different grid numbers, and the plurality of grids correspond to different location areas in the first monitoring picture. Therefore, the grid number of the target in the first monitoring picture may be obtained by using a correspondence between the location of the target and the grid number. Then, the target monitoring system queries the grid correspondence table of the overlapping area according to the grid number of the target in the first monitoring picture. The grid correspondence table includes the correspondence between a grid in which a physical location point is located in the first monitoring picture and a grid in which the same physical location point is located in the second monitoring picture. The second monitoring picture is captured by the second camera. If the grid number of the target in the first monitoring picture is obtained through query in the grid correspondence table, the target monitoring system determines that the location of the target in the first monitoring picture is in the overlapping area. The grid correspondence table may be configured for the overlapping area between the fields of view of the first camera and the second camera by preconfiguring grids in the first monitoring picture and the second monitoring picture. It may be determined, by querying the grid correspondence table, that the location of the target in the first monitoring picture is in the overlapping area.

103. If the location of the target in the first monitoring picture is in the overlapping area, the target monitoring system switches the current primary monitoring camera to the second camera.

In this embodiment of the present invention, it is determined, by using step 102, that the location of the target in the first monitoring picture is in the overlapping area, so that the target monitoring system can switch the current primary monitoring camera to the second camera. Therefore, the second camera is used as the primary camera and can continue to track the target. In this embodiment of the present invention, the overlapping area is configured between the first camera and the second camera, and whether the target appears in the overlapping area is detected in real time, so that the primary camera can be switched in real time based on a moving location of the target. Therefore, the primary camera can continuously track the target.

Further, in some embodiments of the present invention, in an implementation scenario of performing steps C1 to C3, after step 103 in which the target monitoring system switches the current primary monitoring camera to the second camera, the method provided in this embodiment of the present invention further includes the following steps:

D1. When the second camera is used as the primary monitoring camera after switching, the target monitoring system queries the grid correspondence table according to the obtained grid number of the target in the first monitoring picture.

D2. If a grid number of the target in the second monitoring picture is obtained through query in the grid correspondence table, the target monitoring system determines that the target is found in the second monitoring picture.

D3. The target monitoring system obtains location information of the target in the second monitoring picture according to the grid number of the target in the second monitoring picture.

In the implementation scenario of locating the target by using the grid in C1 to C3, a location of the target in the second monitoring picture may also be determined by querying the grid correspondence table. When the second camera is used as the primary monitoring camera after switching, the target monitoring system queries the grid correspondence table according to the obtained grid number of the target in the first monitoring picture. If the grid number of the target in the second monitoring picture is obtained through query in the grid correspondence table, the target monitoring system determines that the target is found in the second monitoring picture. Therefore, the target monitoring system obtains the location information of the target in the second monitoring picture according to the grid number of the target in the second monitoring picture. For details about a specific implementation scenario of the grid number, refer to descriptions of examples in the following embodiments.

In some embodiments of the present invention, the target monitoring system further includes the controller and a monitoring screen, and step 104 in which the target monitoring system switches the current primary monitoring camera to the second camera specifically includes the following step:

E1. The controller switches the second monitoring picture to the monitoring screen; or E2. the controller highlights the second monitoring picture on the monitoring screen; or E3. the controller splices the second monitoring picture and the first monitoring picture, and displays a spliced picture on the monitoring screen.

The monitoring screen is configured in the target monitoring system provided in this embodiment of the present invention, so that monitoring pictures of a plurality of cameras may be displayed on the monitoring screen. When the second camera is used as the primary camera, one implementable manner is that the controller switches the second monitoring picture to the monitoring screen, so that the target in the second monitoring picture can be displayed by using the monitoring screen. In another implementation of the present invention, if the monitoring pictures of the plurality of cameras are simultaneously displayed on the monitoring screen, when the second camera is used as the primary camera, the controller may alternatively highlight the second monitoring picture on the monitoring screen. In another implementation of the present invention, if the monitoring pictures of the plurality of cameras are simultaneously displayed on the monitoring screen, the controller may alternatively splice the second monitoring picture and the first monitoring picture, and display a spliced picture on the monitoring screen. Therefore, a target moving process in which the target moves from the first monitoring picture to the second monitoring picture can be visually displayed by using the monitoring screen, thereby tracking a place from which the target comes and a place to which the target is headed.

In some embodiments of the present invention, the target monitoring system further includes the controller and a memory, and after step 104 in which the target monitoring system switches the current primary monitoring camera to the second camera, the method provided in this embodiment of the present invention further includes the following step:

F1. The controller stores, in the memory, the second monitoring picture obtained by the second camera by photographing the target.

The memory may further be configured in the target monitoring system. When the second camera is used as the primary camera, to record tracking on the target, the second monitoring picture captured by the second camera when the second camera is used as the primary camera may be stored in the memory, so that a video image in which the target appears in the second monitoring picture is directly extracted by using the memory, thereby rapidly and intuitively obtaining the video or the image of the target without manually searching all monitoring pictures in which the target is not paragraphed.

It can be learned based on the descriptions of the examples of the present invention in the foregoing embodiment that, the overlapping area exists between the fields of view of the first camera and the second camera. For the overlapping area, when the to-be-tracked target moves from the first monitoring picture to the overlapping area, the primary camera is switched from the first camera to the second camera. Location sharing of the target may be implemented between the first camera and the second camera. Once the target enters the overlapping area between the fields of view of the two cameras, the second camera may determine the location of the target in a field-of-view picture of the second camera by using the neighboring first camera, and may rapidly track the target based on the location. Each camera does not need to perform detection by itself to determine the location of the target. Therefore, tracking efficiency can be improved.

In this embodiment of the present invention, cameras are arranged in a manner in which an overlapping area is required between fields of view of neighboring cameras. After the arrangement is completed, an observation area (namely, a field of view) of each camera is obtained with reference to parameters such as a current observation angle, a height, a location, and a focal length of the camera. A layer of virtual grids are drawn in a field-of-view picture of an observation area of each camera. Sizes and shapes of the grids may be the same or may be different. Smaller and denser grids indicate higher observation precision. The sizes and shapes of the grids are not specifically limited herein, provided that the drawn grids cover a field-of-view picture of an area that needs to be observed. Subsequently, a two-dimensional coordinate system is established. Coordinates correspond to each virtual grid (namely, grid coordinates) are recorded, to form a grid coordinate list for the field-of-view picture of each camera. The grid coordinate list embodies correspondences between the grids in the field-of-view picture and the coordinates. The grid coordinate list of each camera includes grid numbers, grid coordinates, and correspondences between the grid numbers and the grid coordinates. The grid coordinates are coordinates included in the grids. In a specific embodiment, the grid coordinate list of the camera may be shown in Table 1:

TABLE 1

| Grid number | Grid coordinate | | | |
|---|---|---|---|---|
| | X | Y | W | H |
| 1 | 22 | 35 | 5 | 5 |
| 2 | 22 | 40 | 5 | 5 |
| 3 | 22 | 45 | 5 | 3 |
| 4 | 22 | 50 | 4 | 3 |
| ... | ... | ... | ... | ... |

In Table 1, in the grid coordinates, X may represent a horizontal coordinate of a starting location of a grid, Y may represent a vertical coordinate of the starting location of the grid, W may represent a width of the grid, and H may represent a height of the grid. Certainly, the grid coordinates may alternatively be represented in other forms. For example, the grid coordinates are represented as a two-dimensional coordinate set included in each grid. A specific representation form of the grid coordinates is not limited herein.

Subsequently, a grid correspondence table is set for an overlapping area between the fields of view of the neighboring cameras. The grid correspondence table embodies a correspondence between grids that belong to the field-of-view pictures of the different cameras in the overlapping area. Specifically, several physical locating anchors may be set in the overlapping area. A same physical locating anchor is simultaneously observed by using the neighboring cameras. The grid correspondence table is established according to grid numbers of the same physical positioning anchor in the field-of-view pictures of the different cameras. If a camera has a plurality of neighboring cameras, an overlapping area exists between a field of view of the camera and a field of view of each neighboring camera. A grid correspondence table is established for each overlapping area. In a specific embodiment, an example in which the neighboring cameras are the first camera and the second camera are used, and the established grid correspondence table may be shown in Table 2:

TABLE 2

| Second camera | First camera | | | | |
|---|---|---|---|---|---|
| | 1 | 2 | 3 | 4 | ... |
| 1 | | | | O | |
| 2 | O | | | | |
| 3 | | | O | | |
| 4 | | O | | | |
| ... | | | | | |

The correspondence shown in Table 2 is specifically: A grid 1 of the first camera corresponds to a grid 2 of the second camera, a grid 2 of the first camera corresponds to a grid 4 of the second camera, a grid 3 of the first camera corresponds to a grid 3 of the second camera, and a grid 4 of the first camera corresponds to a grid 1 of the second camera.

The established grid coordinate list and grid correspondence table may be stored in a corresponding camera, or may be stored in the controller. The controller may be specifically a device such as a terminal or a server.

Figure 2:
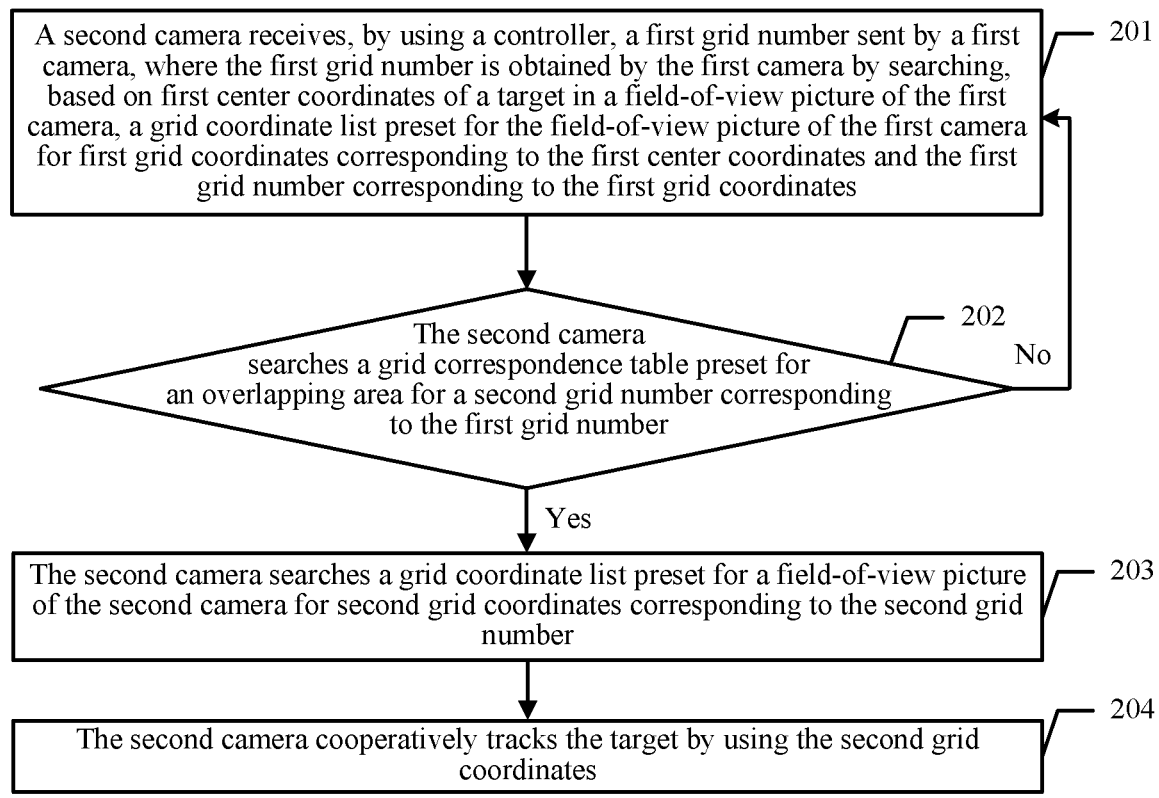
FIG. 2 is another schematic flowchart of a target monitoring method according to an embodiment of the present invention.

A target monitoring method provided in an embodiment of the present invention is applied to a target monitoring system. The target monitoring system includes a first camera and a second camera. Referring to FIG. 2, the another method provided in this embodiment includes the following steps.

201. The second camera receives, by using a controller, a first grid number sent by the first camera, where the first grid number is obtained by the first camera by searching, based on first center coordinates of a target in a field-of-view picture of the first camera, a grid coordinate list preset for the field-of-view picture of the first camera for first grid coordinates corresponding to the first center coordinates and the first grid number corresponding to the first grid coordinates.

During specific implementation, the first camera stores a grid coordinate list preset for the field-of-view picture of the first camera and a grid correspondence table preset for an overlapping area between fields of view of the first camera and the neighboring second camera. The second camera stores a grid coordinate list preset for a field-of-view picture of the second camera and the grid correspondence table preset for the overlapping area between the fields of view of the second camera and the neighboring first camera. Different cameras store a same grid correspondence table for a same overlapping area. When a camera has a plurality of neighboring cameras, there are a plurality of grid correspondence tables stored in the camera. Each grid correspondence table is for one overlapping area.

When a target needs to be tracked, the controller may first determine a field of view that is of a camera and in which the target is located. For example, if the controller determines that the target is currently in the field of view of the first camera, the controller may send a target tracking request to the first camera. The target tracking request may include characteristic information of the target. The characteristic information of the target may be, for example, a color and grayscale of the target. The characteristic information of the target may be embodied by using an image, a text, or the like. Alternatively, the target may be recognized by using an image recognition technology. The first camera receives the target tracking request sent by the controller. The first camera may perform detection based on the characteristic information of the target to determine a location of the target in the field-of-view picture of the first camera, and track the target based on the location of the target in the field-of-view picture of the first camera; or a user may manually select a location of the target in the field-of-view picture of the first camera, and the first camera tracks the target based on the location selected by the user.

After tracking the target, the first camera may calculate the first center coordinates of the target in the field-of-view picture of the first camera. The first center coordinates may be coordinates of a center of the target in the field-of-view picture of the first camera. The center coordinates, may be, for example, P(x0, y0). After obtaining the first center coordinates, the first camera searches the grid coordinate list preset for the field-of-view picture of the first camera for the first grid coordinates corresponding to the first center coordinates and the first grid number corresponding to the first grid coordinates. The first camera sends the first grid number to the second camera by using the controller.

As shown in Table 1, coordinates of each grid include a width and a height of the grid. The center coordinates P(x0, y0) may be compared with the coordinates of each grid, to determine a coordinate range of a grid in which P(x0, y0) fall, so that it may be determined that P(x0, y0) correspond to the coordinates of the grid. After a grid number corresponding to the grid coordinates is determined, it may be determined that the target enters the grid. For example, the grid coordinate list stored in the first camera is shown in Table 1. If the first center coordinates are P(23, 42), it may be determined, according to Table 1, that the target currently enters a grid whose number is 2 in the field-of-view picture of the first camera.

202. The second camera searches the grid correspondence table preset for the overlapping area for a second grid number corresponding to the first grid number; and if the second grid number corresponding to the first grid number is found, the second camera performs step 203; or otherwise, returns to step 201.

If the second grid number corresponding to the first grid number is not found by the second camera by searching the grid correspondence table preset for the overlapping area, it indicates that the target does not enter the overlapping area between the fields of view of the first camera and the second camera. The second camera returns to performing step 201, and continues to wait for a next grid number sent by the first camera.

If the second grid number corresponding to the first grid number is found by the second camera by searching the grid correspondence table preset for the overlapping area, it indicates that the target has entered the overlapping area between the fields of view of the first camera and the second camera. Specifically, in the foregoing example, if a grid number that is received by the second camera by using the controller and that is sent by the first camera is 2, and the grid correspondence table preset in the second camera is shown in Table 2, the second camera may determine, according to Table 2, that the target enters the grid 4 of the field-of-view picture of the second camera.

203. The second camera searches a grid coordinate list preset for a field-of-view picture of the second camera for second grid coordinates corresponding to the second grid number.

For example, the grid coordinate list stored in the second camera is shown in Table 3:

TABLE 3

| Grid number | Grid coordinate | | | |
|---|---|---|---|---|
| | X | Y | W | H |
| 1 | 16 | 35 | 4 | 5 |
| 2 | 18 | 45 | 5 | 3 |
| 3 | 16 | 35 | 5 | 5 |
| 4 | 18 | 50 | 4 | 5 |
| ... | ... | ... | ... | ... |

In the foregoing example, if it is found that the corresponding second grid number is the grid 4, the second camera may cooperatively track, according to Table 3, the target at grid coordinates (18, 50, 4, 4) corresponding to the grid 4.

204. The second camera cooperatively tracks the target by using the second grid coordinates.

In addition, when receiving, by using the controller, the first grid number sent by the first camera, the second camera may further receive, by using the controller, the characteristic information of the target that is sent by the first camera, and after finding the second grid coordinates, the second camera may further determine, based on the characteristic information of the target, whether a target at the second grid coordinates is the target that needs to be tracked.

In a process in which the second camera cooperatively tracks the target, if the target disappears from the field-of-view picture of the first camera, the first camera may send a target disappearance notification to the second camera by using the controller. Then, the second camera calculates second center coordinates of the target in the field-of-view picture of the second camera, searches the grid coordinate list preset for the field-of-view picture of the second camera for third grid coordinates corresponding to the second center coordinates and a third grid number corresponding to the third grid coordinates, and sends the third grid number to a neighboring camera by using the controller.

The foregoing process may be understood as: Initially, when it is determined that the target is located in the field-of-view picture of the first camera, it may be considered that the first camera is a primary camera, and another camera neighboring to the first camera is a secondary camera. The first camera shares location coordinates (namely, a grid number) of the target in the field-of-view picture of the first camera with the another neighboring camera, so that the another neighboring camera may implement cooperative tracking based on the location coordinates of the target. Once the target disappears from the field-of-view picture of the first camera, after the first camera sends the target disappearance notification to the another neighboring camera, it may be considered that the another neighboring camera paragraphing the target is the primary camera. The neighboring camera also shares location coordinates of the target with another camera neighboring to the neighboring camera, so that the another camera cooperatively tracks the target based on the shared location coordinates.

Figure 3:
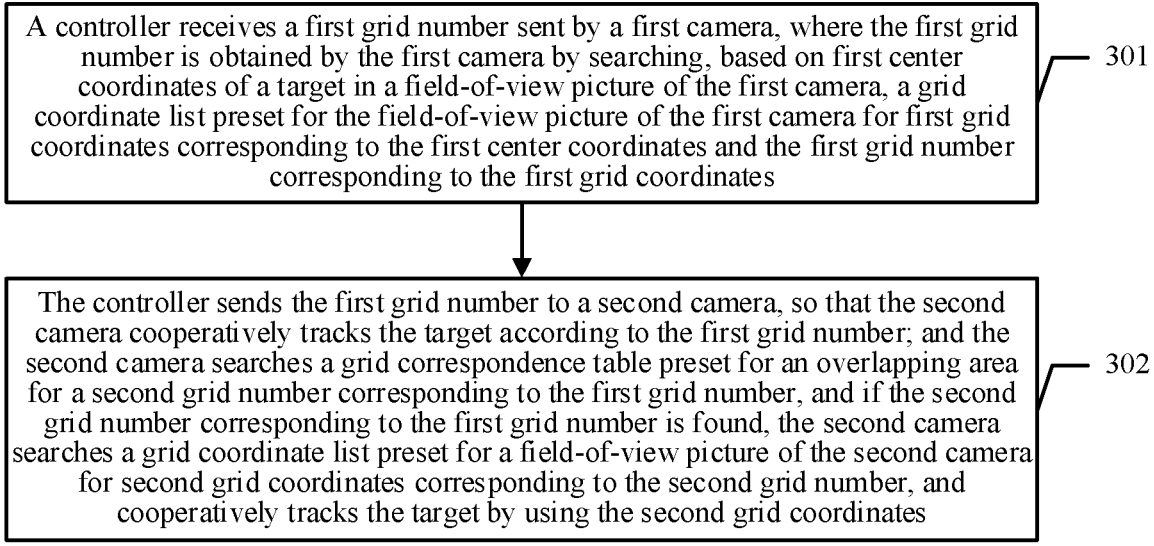
FIG. 3 is another schematic flowchart of a target monitoring method according to an embodiment of the present invention.

A target monitoring method provided in an embodiment of the present invention is described below from a controller side. Referring to FIG. 3, the method in this embodiment includes the following steps.

301. A controller receives a first grid number sent by a first camera, where the first grid number is obtained by the first camera by searching, based on first center coordinates of a target in a field-of-view picture of the first camera, a grid coordinate list preset for the field-of-view picture of the first camera for first grid coordinates corresponding to the first center coordinates and the first grid number corresponding to the first grid coordinates.

During specific implementation, when a target needs to be tracked, the controller may first determine a field of view that is of a camera and in which the target is located. For example, if the controller determines that the target is currently in a field of view of the first camera, the controller may send a target tracking request to the first camera. The target tracking request may include characteristic information of the target. The characteristic information of the target may be, for example, a color and grayscale of the target. The characteristic information of the target may be embodied by using an image, a text, or the like. The target tracking request may be directly initiated by the controller, or the target tracking request may be received by the controller from another device.

After receiving the target tracking request sent by the controller, the first camera may perform detection based on the characteristic information of the target to determine a location of the target in the field-of-view picture of the first camera, and track the target based on the location of the target in the field-of-view picture of the first camera; or a user may manually select a location of the target in the field-of-view picture of the first camera, and the first camera tracks the target based on the location selected by the user. After tracking the target, the first camera searches, by using the first center coordinates of the target in the field-of-view picture of the first camera, a grid coordinate list preset for the field-of-view picture of the first camera, to obtain the first grid coordinates corresponding to the first center coordinates and the first grid number corresponding to the first grid coordinates, and sends the first grid number to the controller. The controller receives the first grid number sent by the first camera.

302. The controller sends the first grid number to a second camera, so that the second camera cooperatively tracks the target according to the first grid number; and the second camera searches a grid correspondence table preset for an overlapping area for a second grid number corresponding to the first grid number, and if the second grid number corresponding to the first grid number is found, searches a grid coordinate list preset for a field-of-view picture of the second camera for second grid coordinates corresponding to the second grid number, and cooperatively tracks the target by using the second grid coordinates.

When the target disappears from the field-of-view picture of the first camera, the first camera sends a target disappearance notification to the controller. The controller receives the target disappearance notification sent by the first camera, and sends the target disappearance notification to the second camera. After receiving the target disappearance notification, the second camera calculates second center coordinates of the target in the field-of-view picture of the second camera, searches the grid coordinate list preset for the field-of-view picture of the second camera for third grid coordinates corresponding to the second center coordinates and a third grid number corresponding to the third grid coordinates, and sends the third grid number to the controller. The controller sends the third grid number to the first camera. The first camera cooperatively tracks the target according to the third grid number.

The grid coordinate list and the grid correspondence table are stored in a corresponding camera, and corresponding calculation processing is performed the corresponding camera. The controller in this embodiment mainly provides an information transferring function.

For brevity description, for steps that are not described in detail in this embodiment, refer to the descriptions of the foregoing embodiment.

In this embodiment, cameras are arranged in a manner in which an overlapping area is required between field-of-view pictures of neighboring cameras. A grid coordinate list is preset for a field-of-view picture of each camera. A grid correspondence table is preset for an overlapping area between field-of-view pictures of each camera and another camera. The grid coordinate list and the grid correspondence table are stored in a corresponding camera. After tracking the target, the first camera shares a location (namely, a grid number) of the target with the neighboring second camera. When the target enters the field-of-view picture of the neighboring second camera, the second camera may determine the location of the target by using the grid number sent by the neighboring first camera, the preset grid correspondence table, and the preset grid coordinate list without needing to perform detection by itself to determine the location of the target. Therefore, cooperative tracking efficiency can be improved.

Figure 4:
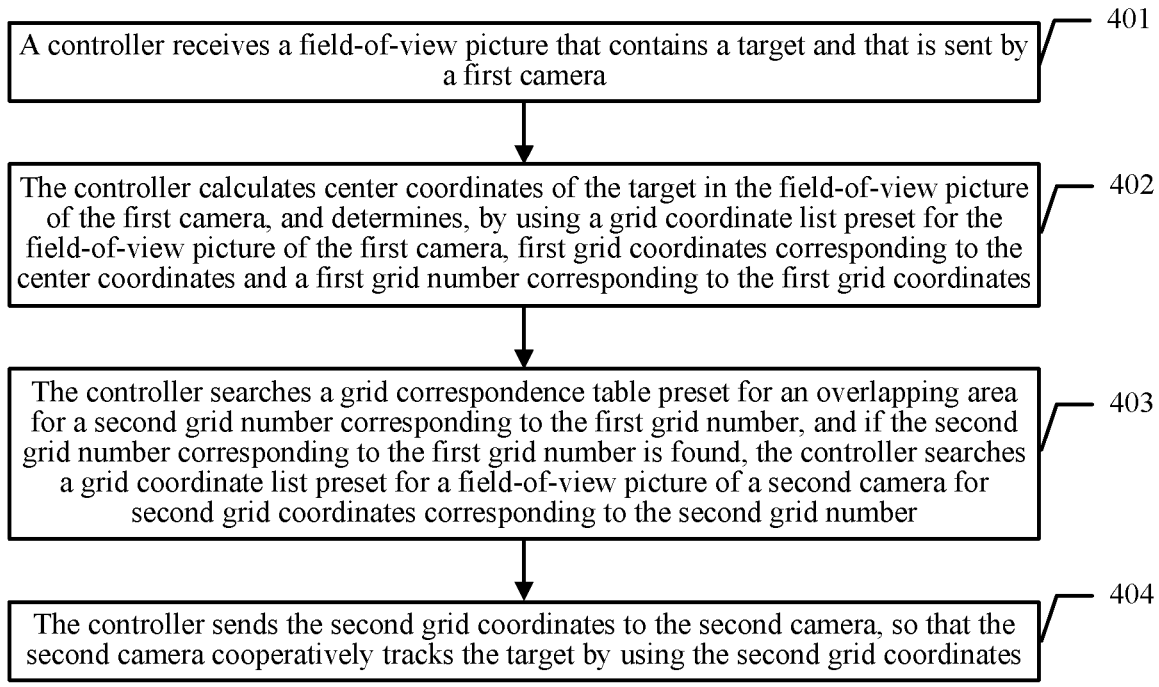
FIG. 4 is another schematic flowchart of a target monitoring method according to an embodiment of the present invention.

A target monitoring method provided in an embodiment of the present invention when an established grid coordinate list and an established grid correspondence table are stored in a controller is described below. Referring to FIG. 4, the another method provided in this embodiment includes the following steps.

401. The controller receives a field-of-view picture that contains a target and that is sent by a first camera.

During specific implementation, the controller stores a grid coordinate list preset for the field-of-view picture of the first camera, a grid coordinate list preset for a field-of-view picture of a second camera, and a grid correspondence table preset for an overlapping area between fields of view of the first camera and the neighboring second camera.

When a target needs to be tracked, the controller may first determine a field of view that is of a camera and in which the target is located. For example, if the controller determines that the target is currently in the field of view of the first camera, the controller may send a target tracking request to the first camera. The target tracking request may include characteristic information of the target. The characteristic information of the target may be, for example, a color and grayscale of the target. The characteristic information of the target may be embodied by using an image, a text, or the like. The first camera receives the target tracking request sent by the controller. The first camera may perform detection based on the characteristic information of the target to determine a location of the target in the field-of-view picture of the first camera, and track the target based on the location of the target in the field-of-view picture of the first camera; or a user may manually select a location of the target in the field-of-view picture of the first camera, and the first camera tracks the target based on the location selected by the user. After tracking the target, the first camera sends the field-of-view picture containing the target to the controller.

402. The controller calculates center coordinates of the target in the field-of-view picture of the first camera, and determines, by using a grid coordinate list preset for the field-of-view picture of the first camera, first grid coordinates corresponding to the center coordinates and a first grid number corresponding to the first grid coordinates.

The center coordinates may be two-dimensional coordinates. The center coordinates may be coordinates of a center of the target in the field-of-view picture of the first camera. For example, the center coordinates are P(x0, y0). As shown in Table 1, the grid coordinate list includes grid coordinates. Coordinates of each grid include a width and a height of the grid. The center coordinates P(x0, y0) may be compared with the coordinates of each grid, to determine a coordinate range of a grid in which P(x0, y0) fall, so that it may be determined that P(x0, y0) correspond to the coordinates of the grid. After a grid number corresponding to the grid coordinates is determined, it may be determined that the target enters the grid. For example, the grid coordinate list that is preset for the field-of-view picture of the first camera and that is stored in the controller is shown in Table 1. If the first center coordinates are P(23, 42), it may be determined, according to Table 1, that the target currently enters a grid whose number is 2 in the field-of-view picture of the first camera.

403. The controller searches the grid correspondence table preset for the overlapping area for a second grid number corresponding to the first grid number, and if the second grid number corresponding to the first grid number is found, the controller searches a grid coordinate list preset for a field-of-view picture of a second camera for second grid coordinates corresponding to the second grid number.

If the second grid number corresponding to the first grid number is not found by the controller by searching the grid correspondence table preset for the overlapping area, it indicates that the target does not enter the overlapping area between the fields of view of the first camera and the second camera. The controller returns to performing step 401, and continues to receive a field-of-view picture that is sent by the first camera and that contains the target.

If the second grid number corresponding to the first grid number is found by the controller by searching the grid correspondence table preset for the overlapping area, it indicates that the target has entered the overlapping area between the fields of view of the first camera and the second camera. Specifically, in the foregoing example, if the first grid number calculated by the controller is 2, and the grid correspondence table preset for the overlapping area is shown in Table 2, the controller may determine, according to Table 2, that the target enters a grid 4 of the field-of-view picture of the second camera.

404. The controller sends the second grid coordinates to the second camera, so that the second camera cooperatively tracks the target by using the second grid coordinates.

If the grid coordinate list that is stored in the controller and that is preset for the field-of-view picture of the second camera is shown in Table 3, the controller may send grid coordinates (18, 50, 4, 4) corresponding to the grid 4 to the second camera, so that the second camera cooperatively tracks the target at the grid coordinates (18, 50, 4, 4).

A target monitoring method provided in an embodiment of the present invention is described below from a camera side. Referring to FIG. 5, the method in this embodiment includes the following steps.

501. A second camera receives second grid coordinates sent by a controller, where the second grid coordinates are obtained by the controller based on a field-of-view picture that is sent by a first camera and that contains a target, and the controller calculates center coordinates of the target in the field-of-view picture of the first camera, determines, by using a grid coordinate list preset for the field-of-view picture of the first camera, first grid coordinates corresponding to the center coordinates and a first grid number corresponding to the first grid coordinates, searches a grid correspondence table preset for the overlapping area for a second grid number corresponding to the first grid number, and obtains the second grid coordinates corresponding to the second grid number by searching a grid coordinate list preset for a field-of-view picture of the second camera.

502. The second camera cooperatively tracks the target by using the second grid coordinates.

Subsequently, the second camera also sends a field-of-view picture containing the tracked target to the controller.

In this embodiment, cameras are arranged in a manner in which an overlapping area is required between field-of-view pictures of neighboring cameras. A grid coordinate list is preset for a field-of-view picture of each camera. A grid correspondence table is preset for an overlapping area between field-of-view pictures of each camera and another camera. The grid coordinate list and the grid correspondence table are stored in the controller. After tracking the target, the first camera transmits a field-of-view picture containing the target to the controller. The controller calculates a location of the target in the field-of-view picture of the first camera, and when determining that the target enters the overlapping area between the fields of view of the two cameras, sends location coordinates of the target in the field-of-view picture of the second camera to the second camera. The second camera may determine the location of the target based on the location coordinates sent by the controller without needing to perform detection by itself to determine the location of the target. Therefore, cooperative tracking efficiency can be improved.

The camera and the controller that are provided in the embodiments of the present invention are described below. The controller may be a terminal or a server. When the controller is a terminal, the controller may directly initiate a target tracking request and cooperatively tracks the target with a camera. When the controller is a server, the controller may receive a target tracking request sent by a terminal, and after sending the target tracking request to a corresponding camera, cooperatively tracks the target with the camera. For example, a terminal stores a picture of a to-be-tracked suspect. If the terminal serves as the controller, the terminal may directly initiate a target tracking request to a camera and cooperatively tracks the target with the camera; or if the server serves as the controller, the terminal may send the picture of the suspect to a server, and the server initiates a target tracking request to a camera and cooperatively tracks the target with the camera.

In the present invention, a target may be cooperatively located and tracked based on vision. After determining the tracked target and location information of the tracked target, a primary camera shares information such as a location of the tracked target with another nearby camera. The another camera may rapidly capture and track the target based on the location information and the like. In this embodiment of the present invention, the primary camera shares the location and another auxiliary information of the target, to help the another camera rapidly capture and track the target, thereby improving efficiency of detecting the target and a capability of continuously tracking the target. A plurality of cameras can efficiently capture and track a particular target in a cooperative manner, and the target can be automatically and continuously tracked, so that advantages of cooperative tracking of the plurality of cameras are exerted. The solution provided in this embodiment of the present invention may include the following steps.

First, grid-based processing is performed on space of a picture: An overlapping area is required between fields of view (Field of View, FOV) of neighboring cameras. A camera A draws, with reference to a current observation angle, a height, and a focal length of the camera A, a layer of virtual grids on space that is of a picture and that is observed by using the current focal length of the camera. Sizes and shapes of the grids are not limited, provided that an area that needs to be observed is covered. Moreover, virtual coordinates of each grid are recorded to form a grid coordinate list Grid A of the camera. Then, a correspondence between grids in the overlapping area is established: It is determined through actual measurement that, by using a focal length and a depth of field, a correspondence between two grids that can correspond to a same physical location point in respective pictures of two neighboring cameras (A and B) is established, and is recorded into a grid correspondence table Map (A, B). Subsequently, location coordinates of a shared target are queried: After detecting or manually selecting any to-be-tracked target based on an object characteristic, the camera A is used as a current primary camera. The primary camera continuously tracks the target, and constantly matches center coordinates of the target with the grid coordinate list Grid A in a current picture. Once the center coordinates of the target match a grid, it may be learned that a number of the grid in which the target is currently located is k. Then, the primary camera sends the grid number k and additional characteristic information (where other information that is of the target and that is provided by the primary camera includes a color, grayscale, and the like) of the target to the camera B neighboring to the camera A. A relative location and an angle are calculated: The neighboring camera B receives target data, queries the grid correspondence table Map (A, B) by using the received grid number of the target, and if a grid number s corresponding to the neighboring camera B is obtained through query, the camera B rapidly captures and continuously tracks the target according to the grid number: The neighboring camera B determines, according to the grid number s obtained based on the foregoing content, whether characteristic information, such as a color in the grid area, conforms to the received additional characteristic information. If the characteristic information conforms to the received additional characteristic information, it indicates that the tracked target has entered the grid area s of the neighboring camera. The camera immediately captures and starts tracking the target. In addition, once the target disappears in a visible area of the primary camera, the neighboring camera is used as the current primary camera.

Next, the technical solution of the present invention is described in detail below by using specific embodiments. The solution provided in this embodiment of the present invention may include the following steps.

Step 1. Perform grid-based processing on space of a picture.

An overlapping area is required between fields of view FOV of neighboring cameras. A camera A draws, with reference to a current observation angle, a height, and a range of the camera A, a layer of virtual grids on space that is of a picture and that is observed by using a current focal length of the camera. Sizes and shapes of the grids are not limited, provided that an area that needs to be observed is covered. Smaller and denser grids indicate higher observation precision. A grid relatively far away from the camera may be set to be smaller. Moreover, virtual coordinates of each grid are recorded to form a grid coordinate list Grid A of the camera. The grid coordinate list may be stored in a storage device of the camera, or may be stored in a central controller (for example, a video server).

Step 2. Establish a correspondence between grids in an overlapping area.

It is determined through actual measurement that within a focal length and an observation depth of field, a correspondence between two grids that can correspond to a same physical location point in respective pictures of two neighboring cameras (A and B) is established, and is recorded into a grid correspondence table Map (A, B). Specifically, some locating anchor nodes may be placed on the ground. The anchor nodes are observed by using pictures of the two cameras. Then, the correspondence between the grids in the camera A and the camera B is established based on a same anchor node observed in a same grid.

Step 3. Query location coordinates of a shared target.

In a picture captured by the camera A, after the to-be-tracked target is detected or manually selected based on a given characteristic, the camera A is used as a current primary camera. The primary camera A continuously tracks the target, and calculates coordinates P(x0, y0) of a center of the target in the picture. Then, the grid coordinate list Grid A is queried by using P(x0, y0). Each grid in each Grid A has a width and a height. P(x0, y0) are compared with the grids one by one. Once P(x0, y0) fall within coverage of a grid k (Xk, Yk), it may be determined that the target enters the grid. In this way, it may be learned that a number of the grid in which the target is currently located is k. Then, the primary camera A sends the grid number k and additional characteristic information (where other information that is of the target and that is provided by the primary camera may include a color, grayscale, and the like) of the target to the camera B neighboring to the camera A.

Step 4. Calculate a relative location and an angle.

The neighboring camera B receives target data, queries the grid correspondence table Map (A, B) with reference to the received grid number of the target, and if a grid number s corresponding to the neighboring camera B can be obtained through query, the camera B performs step 5; or otherwise, performs step 4.

Step 5. Rapidly capture and continuously track the target according to a grid number.

The neighboring camera B may obtain, by querying Grid B according to the grid number information s obtained in step 4, coordinates of a grid s in which the target is currently located, and then determines whether characteristic information in the grid area s conforms to the received additional characteristic information of the target. If the characteristic information conforms to the received additional characteristic information, it indicates that the tracked target has entered the grid area s of the camera. The camera can immediately capture and track the target. In addition, once the target disappears in a visible area of the primary camera, the neighboring camera B automatically changes into the current primary camera with assistance of the central controller and performs step 3.

In the present invention, the location information of the target is shared, so that other cameras can rapidly capture and continuously track the target by using the obtained location and the obtained characteristic information of the target, thereby shortening a detection time and improving tracking efficiency. It is beneficial for a plurality of cameras to automatically and efficiently track a particular target in a cooperative manner. Role switching of the primary camera ensures continuity and stability of tracking, and advantages of cooperation of the plurality of cameras are fully exerted. The present invention can improve efficiency of cooperatively recognizing and tracking a target by a plurality of cameras, and has a broad application prospect in safety monitoring, traffic monitoring, and police monitoring, and particularly, in real-time automatic target tracking. In addition, with reference to other information captured by the cameras, for example, information about shops around a tracked object may further lay a good foundation for a location-based service (location based service). This can reduce overheads of installing short-distance communications devices in different locations, and also can improve efficiency of monitoring a target.

The target monitoring method provided in the present invention is described in detail in the foregoing embodiments. Subsequently, the camera, the controller, and the target monitoring system that are provided in the embodiments of the present invention are described in detail below. A composition structure of the camera may be shown in FIG. 6-*a*, FIG. 6-*b*, and FIG. 6-*c*. A structure of the target monitoring system is shown in FIG. 7-*a* and FIG. 7-*b*. A structure of the controller may be shown in FIG. 8-*a*, FIG. 8-*b*, FIG. 8-*c*, and FIG. 8-*d*. Another structure of the target monitoring system is shown in FIG. 9-*a* and FIG. 9-*b*.

The camera 600 shown in FIG. 6-*a* is specifically a first camera in the target monitoring system, the target monitoring system includes the first camera and a second camera, and the first camera 600 includes:

a first location obtaining module 601, configured to: when the first camera is used as a current primary monitoring camera, obtain location information of a to-be-tracked target in a first monitoring picture, where the first monitoring picture is captured by the first camera;

an overlapping area judging module 602, configured to determine, based on the location information of the target in the first monitoring picture, whether a location of the target in the first monitoring picture is in an overlapping area, where the overlapping area is an overlapping range between a field of view of the first camera and a field of view of the second camera; and a switching module 603, configured to: if the location of the target in the first monitoring picture is in the overlapping area, switch the current primary monitoring camera to the second camera.

In some embodiments of the present invention, as shown in FIG. 6-*b*, the overlapping area judging module 602 includes:

a grid determining module 6021, configured to determine a grid number of the target in the first monitoring picture based on the location information of the target in the first monitoring picture, where a plurality of grids are preset in the first monitoring picture, the plurality of grids have different grid numbers, and the plurality of grids correspond to different location areas in the first monitoring picture;

a first grid querying module 6022, configured to query, according to the grid number of the target in the first monitoring picture, a grid correspondence table of the overlapping area, where the grid correspondence table includes a correspondence between a grid in which a physical location point is located in the first monitoring picture and a grid in which the same physical location point is located in a second monitoring picture, and the second monitoring picture is captured by the second camera; and an overlapping area determining module 6023, configured to: if the grid number of the target in the first monitoring picture is obtained through query in the grid correspondence table, determine that the location of the target in the first monitoring picture is in the overlapping area.

In some embodiments of the present invention, as shown in FIG. 6-*c*, the first camera 600 further includes a characteristic detection module 604.

The characteristic detection module 604 is configured to: before the first location obtaining module 601 obtains the location information of the to-be-tracked target in the first monitoring picture, obtain characteristic information of the target, and detect, based on the characteristic information, whether the target appears in the first monitoring picture; and if the target appears in the first monitoring picture, trigger execution of the location obtaining module.

Referring to FIG. 7-*a*, the target monitoring system 700 includes the first camera 701 according to any one of FIG. 6-*a*, FIG. 6-*b*, or FIG. 6-*c* and a second camera 702.

Further, in FIG. 7-*b*, the second camera 702 includes:

a second grid querying module 7021, configured to: after the first camera switches a current primary monitoring camera to the second camera, when the second camera is used as the primary monitoring camera after switching, query the grid correspondence table according to an obtained grid number of the target in the first monitoring picture;

a target locking module 7022, configured to: if a grid number of the target in the second monitoring picture is obtained through query in the grid correspondence table, determine that the target is found in the second monitoring picture; and a second location obtaining module 7023, configured to obtain location information of the target in the second monitoring picture according to the grid number of the target in the second monitoring picture.

Referring to FIG. 8-*a*, an embodiment of the present invention provides a controller 800. The controller 800 is deployed in a target monitoring system, the target monitoring system includes the controller 800, a first camera, and a second camera, and the controller 800 includes:

a location obtaining module 801, configured to: when the first camera is used as a current primary monitoring camera, obtain location information of a to-be-tracked target in a first monitoring picture, where the first monitoring picture is captured by the first camera;

an overlapping area judging module 802, configured to determine, based on the location information of the target in the first monitoring picture, whether a location of the target in the first monitoring picture is in an overlapping area, where the overlapping area is an overlapping range between a field of view of the first camera and a field of view of the second camera; and a switching module 803, configured to: if the location of the target in the first monitoring picture is in the overlapping area, switch the current primary monitoring camera to the second camera.

In some embodiments of the present invention, referring to FIG. 8-*b*, the overlapping area judging module 802 includes:

a grid determining module 8021, configured to determine a grid number of the target in the first monitoring picture based on the location information of the target in the first monitoring picture, where a plurality of grids are preset in the first monitoring picture, the plurality of grids have different grid numbers, and the plurality of grids correspond to different location areas in the first monitoring picture;

a grid querying module 8022, configured to query, according to the grid number of the target in the first monitoring picture, a grid correspondence table of the overlapping area, where the grid correspondence table includes a correspondence between a grid in which a physical location point is located in the first monitoring picture and a grid in which the same physical location point is located in a second monitoring picture, and the second monitoring picture is captured by the second camera; and an overlapping area determining module 8023, configured to: if the grid number of the target in the first monitoring picture is obtained through query in the grid correspondence table, determine that the location of the target in the first monitoring picture is in the overlapping area.

In some embodiments of the present invention, referring to FIG. 8-c, the controller 800 further includes:

a target locking module 804, configured to: after the first camera switches the current primary monitoring camera to the second camera, when the second camera is used as the primary monitoring camera after switching, query the grid correspondence table according to the obtained grid number of the target in the first monitoring picture; and if a grid number of the target in the second monitoring picture is obtained through query in the grid correspondence table, determine that the target is found in the second monitoring picture.

The location obtaining module 801 is further configured to obtain location information of the target in the second monitoring picture according to the grid number of the target in the second monitoring picture.

In some embodiments of the present invention, the location obtaining module 801 is specifically configured to: before the location obtaining module obtains the location information of the to-be-tracked target in the first monitoring picture, detect characteristic information of the target in the first monitoring picture; and if the characteristic information is detected in the first monitoring picture, calculate the location information of the target in the first monitoring picture, and send the location information of the target in the first monitoring picture to the first camera.

In some embodiments of the present invention, the target monitoring system further includes a monitoring screen, and the switching module 803 is specifically configured to switch the second monitoring picture to the monitoring screen, or highlight the second monitoring picture on the monitoring screen, or splice the second monitoring picture and the first monitoring picture, and display a spliced picture on the monitoring screen.

In some embodiments of the present invention, the target monitoring system further includes a memory. Referring to FIG. 8-d, the controller 800 further includes a storage module 805 configured to: after the switching module 803 switches the current primary monitoring camera to the second camera, store, in the memory, the second monitoring picture obtained by the second camera by photographing the target.

Referring to FIG. 9-a, the target monitoring system 900 includes: the controller 901 according to any one of FIG. 8-a, FIG. 8-b, FIG. 8-c, or FIG. 8-d, a first camera 902, and a second camera 903.

Further, in FIG. 9-b, the target monitoring system 900 further includes a monitoring screen 904 and/or a memory 905.

In FIG. 9-b, an example in which the target monitoring system 900 includes the monitoring screen 904 and the memory 905 is used for description.

In the first camera and the controller in the foregoing embodiments, separately referring to FIG. 10 and FIG. 11, in FIG. 10, the first camera 1000 includes a memory 1001, a processor 1002, and a transceiver 1003; and in FIG. 11, the controller 1100 includes a memory 1101, a processor 1102, and a transceiver 1103. The memory may include a random access memory (Random Access Memory, RAM), a non-volatile the memory (non-volatile memory), a magnetic disk storage, and the like. The transceiver implements functions of a receiving unit and a sending unit. The transceiver may include an antenna, a circuit, and the like. The processor may be a central processing unit (Central Processing Unit, CPU), or the processor may be an application-specific integrated circuit (Application Specific Integrated Circuit, ASIC for short), or the processor may be one or more integrated circuits configured to implement the embodiments of the present invention. The processor, the memory, and the transceiver may be connected by using a bus. The processor is configured to control reading and writing of the memory and receiving and sending of the transceiver. For details about method steps performed by the processor, refer to the detailed descriptions about the method part in the foregoing embodiments. Details are not described herein again.

It should be noted that, for steps and beneficial effects that are not described in detail in the apparatus embodiments of the present invention, refer to the descriptions in the corresponding method embodiments, and details are not described herein again.

Persons skilled in the art may clearly understand that, for the purpose of convenient and brief description, for a detailed working process of the foregoing system, apparatus, and unit, refer a corresponding process in the foregoing method embodiments, and details are not described herein.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, a network device, or the like) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A target monitoring method performed by a target monitoring system comprising a first camera and a second camera, wherein the target monitoring method comprises:
   obtaining location information of a target in a first monitoring picture using the first camera as a primary monitoring camera to track the target, wherein the first monitoring picture is from the first camera;
   determining, based on the location information of the target in the first monitoring picture, that a location of the target in the first monitoring picture is in an overlapping area, wherein the overlapping area is an overlapping range between a field of view of the first camera and a field of view of the second camera, and wherein determining that the location of the target in the first monitoring picture is in the overlapping area comprises:
      determining a grid number of the target in the first monitoring picture based on the location information of the target in the first monitoring picture, wherein a plurality of grids is preset in the first monitoring picture, wherein the grids have different grid numbers, and wherein the grids correspond to different location areas in the first monitoring picture;
      querying, according to the grid number of the target in the first monitoring picture, a grid correspondence table of the overlapping area, wherein the grid correspondence table comprises a correspondence between a grid in which a physical location point is located in the first monitoring picture and a grid in which a same physical location point is located in a second monitoring picture, and wherein the second monitoring picture is from the second camera; and
      determining, by the target monitoring system, that the location of the target in the first monitoring picture is in the overlapping area when the grid number of the target in the first monitoring picture is obtained from the grid correspondence table; and
   switching the primary monitoring camera used to track the target from the first camera to the second camera based on the location of the target in the first monitoring picture being in the overlapping area.

2. The target monitoring method of claim 1, wherein after switching the primary monitoring camera, the target monitoring method further comprises:
   querying the grid correspondence table according to the grid number of the target in the first monitoring picture when using the second camera as the primary monitoring camera;
   determining that the target is found in the second monitoring picture when a grid number of the target in the second monitoring picture is obtained from the grid correspondence table; and
   obtaining location information of the target in the second monitoring picture according to the grid number of the target in the second monitoring picture.

3. The target monitoring method of claim 1, wherein before obtaining the location information of the target in the first monitoring picture, the target monitoring method further comprises:
   obtaining characteristic information of the target;
   detecting, based on the characteristic information, whether the target appears in the first monitoring picture; and
   obtaining the location information of the target in the first monitoring picture when the target appears in the first monitoring picture.

4. The target monitoring method of claim 1, wherein the target monitoring system further comprises a controller, and wherein obtaining the location information of the target in the first monitoring picture comprises:
   obtaining, by the controller, characteristic information of the target;
   detecting, by the controller, the characteristic information of the target in the first monitoring picture;
   calculating, by the controller, the location information of the target in the first monitoring picture when the characteristic information is detected in the first monitoring picture; and
   sending, by the controller, the location information of the target in the first monitoring picture to the first camera.

5. The target monitoring method of claim 1, wherein the target monitoring system further comprises a controller and a monitoring screen, and wherein switching the primary monitoring camera comprises:
   switching, by the controller, a second monitoring picture to the monitoring screen;
   highlighting, by the controller, the second monitoring picture on the monitoring screen;
   or
   splicing, by the controller, the second monitoring picture and the first monitoring picture to generate a spliced picture, and displaying, by the controller, the spliced picture on the monitoring screen.

6. The target monitoring method of claim 1, wherein the target monitoring system further comprises a controller and a memory, and wherein after switching the primary monitoring camera, the target monitoring method further comprises storing, by the controller in the memory, a second monitoring picture from the second camera by photographing the target.

7. The target monitoring method of claim 1, wherein the target monitoring system further comprises a controller and a monitoring screen, and wherein switching the primary monitoring camera comprises:
   highlighting, by the controller, the second monitoring picture on the monitoring screen; or
   splicing, by the controller, the second monitoring picture and the first monitoring picture to generate a spliced picture, and displaying, by the controller, the spliced picture on the monitoring screen.

8. A first camera comprised in a target monitoring system that further comprises a second camera, wherein the first camera comprises:
   a processor; and a memory coupled to the processor and storing instructions that, when executed by the processor, cause the first camera to:
  obtain location information of a target in a first monitoring picture when the first camera is used as a primary monitoring camera to track the target, wherein the first monitoring picture is captured by the first camera;
  determine a grid number of the target in the first monitoring picture based on the location information of the target in the first monitoring picture, wherein a plurality of grids is preset in the first monitoring picture, wherein the grids have different grid numbers, and wherein the grids correspond to different location areas in the first monitoring picture;
  query, according to the grid number of the target in the first monitoring picture, a grid correspondence table of an overlapping area, wherein the overlapping area is an overlapping range between a field of view of the first camera and a field of view of the second camera, wherein the grid correspondence table comprises a correspondence between a grid in which a physical location point is located in the first monitoring picture and a grid in which a same physical location point is located in a second monitoring picture, and wherein the second monitoring picture is from the second camera; and
  determine that the location of the target in the first monitoring picture is in the overlapping area when the grid number of the target in the first monitoring picture is obtained from the grid correspondence table; and
  switch the primary monitoring camera used to track the target from the first camera to the second camera based on the location of the target in the first monitoring picture being in the overlapping area.

9. The first camera of claim 8, wherein before obtaining the location information of the target in the first monitoring picture, the instructions further cause the first camera to:
  obtain characteristic information of the target;
  detect, based on the characteristic information, whether the target appears in the first monitoring picture; and
  obtain the location information of the target in the first monitoring picture when the target appears in the first monitoring picture.

10. A controller deployed in a target monitoring system comprising the controller, a first camera, and a second camera, wherein the controller comprises:
  a processor; and
  a memory coupled to the processor and storing instructions that, when executed by the processor, cause the controller to:
    obtain location information of a target in a first monitoring picture when the first camera is used as a primary monitoring camera used to track the target, wherein the first monitoring picture is from the first camera;
    determine a grid number of the target in the first monitoring picture based on the location information of the target in the first monitoring picture, wherein a plurality of grids is preset in the first monitoring picture, wherein the grids have different grid numbers, and wherein the grids correspond to different location areas in the first monitoring picture;
    query, according to the grid number of the target in the first monitoring picture, a grid correspondence table of an overlapping area, wherein the overlapping area is an overlapping range between a field of view of the first camera and a field of view of the second camera, wherein the grid correspondence table comprises a correspondence between a grid in which a physical location point is located in the first monitoring picture and a grid in which a same physical location point is located in a second monitoring picture, and wherein the second monitoring picture is from the second camera;
    determine that the location of the target in the first monitoring picture is in the overlapping area when the grid number of the target in the first monitoring picture is obtained from the grid correspondence table; and
    switch the primary monitoring camera used to track the target from the first camera to the second camera based on the location of the target in the first monitoring picture being in the overlapping area.

11. The controller of claim 10, wherein the instructions further cause the controller to:
  query the grid correspondence table according to a grid number of the target in the first monitoring picture when using the second camera as the primary monitoring camera after switching;
  determine that the target is found in the second monitoring picture when a grid number of the target in the second monitoring picture is obtained through query in the grid correspondence table; and
  obtain location information of the target in the second monitoring picture according to the grid number of the target in the second monitoring picture.

12. The controller of claim 11, wherein before obtaining the location information of the target in the first monitoring picture, the instructions further cause the controller to:
  detect characteristic information of the target in the first monitoring picture;
  calculate the location information of the target in the first monitoring picture when the characteristic information is detected in the first monitoring picture; and
  send the location information of the target in the first monitoring picture to the first camera.

13. The controller of claim 10, wherein before obtaining the location information of the target in the first monitoring picture, the instructions further cause the controller to:
  detect characteristic information of the target in the first monitoring picture;
  calculate the location information of the target in the first monitoring picture when the characteristic information is detected in the first monitoring picture; and
  send the location information of the target in the first monitoring picture to the first camera.

14. The controller of claim 10, wherein the target monitoring system further comprises a monitoring screen, and wherein the instructions further cause the controller to:
  switch a second monitoring picture to the monitoring screen;
  highlight the second monitoring picture on the monitoring screen; or
  splice the second monitoring picture and the first monitoring picture to generate a spliced picture, and display the spliced picture on the monitoring screen.

15. The controller of claim 10, wherein the target monitoring system further comprises a second memory, and wherein after switching the primary monitoring camera, the instructions further cause the controller to store, in the second memory, a second monitoring picture from the second camera by photographing the target.

16. The controller of claim 10, wherein the instructions further cause the controller to:
- query the grid correspondence table according to the grid number of the target in the first monitoring picture when using the second camera as the primary monitoring camera after switching;
- determine that the target is found in the second monitoring picture when a grid number of the target in the second monitoring picture is obtained from the grid correspondence table; and
- obtain location information of the target in the second monitoring picture according to the grid number of the target in the second monitoring picture.

17. The controller of claim 10, wherein the target monitoring system further comprises a monitoring screen, and wherein the instructions further cause the controller to highlight the second monitoring picture on the monitoring screen.

18. The controller of claim 10, wherein the target monitoring system further comprises a monitoring screen, and wherein the instructions further cause the controller to splice the second monitoring picture and the first monitoring picture to generate a spliced picture, and display the spliced picture on the monitoring screen.

* * * * *

UNITED STATES PATENT AND TRADEMARK OFFICE
CERTIFICATE OF CORRECTION

| | |
|---|---|
| PATENT NO. | : 11,023,727 B2 |
| APPLICATION NO. | : 16/321744 |
| DATED | : June 1, 2021 |
| INVENTOR(S) | : Qiang Ding, Liyao Zhang and Hongrui Jiang |

Page 1 of 1

It is certified that error appears in the above-identified patent and that said Letters Patent is hereby corrected as shown below:

On the Title Page

Page 2, item (56) References Cited, Foreign Patent Documents: "WO 2016049370 A1 07/2016" should read "WO 2016049370 A1 03/2016"

Signed and Sealed this
Twentieth Day of July, 2021

Drew Hirshfeld
*Performing the Functions and Duties of the*
*Under Secretary of Commerce for Intellectual Property and*
*Director of the United States Patent and Trademark Office*